US012503249B2

(12) United States Patent
Suk et al.

(10) Patent No.: US 12,503,249 B2
(45) Date of Patent: Dec. 23, 2025

(54) RAM AIR TURBINE

(71) Applicant: ESS 2 Tech, LLC, Bethlehem, PA (US)

(72) Inventors: Michael Suk, Milton, PA (US); David A. Shoffler, Marion Heights, PA (US)

(73) Assignee: ESS 2 Tech, LLC, Bethlehem, PA (US)

( * ) Notice: Subject to any disclaimer, the term of this patent is extended or adjusted under 35 U.S.C. 154(b) by 0 days.

(21) Appl. No.: 18/173,748

(22) Filed: Feb. 23, 2023

(65) Prior Publication Data
US 2024/0286755 A1   Aug. 29, 2024

(51) Int. Cl.
*B64D 41/00* (2006.01)
*F01D 1/24* (2006.01)
*F01D 5/14* (2006.01)

(52) U.S. Cl.
CPC .............. *B64D 41/007* (2013.01); *F01D 1/24* (2013.01); *F01D 5/141* (2013.01); F05D 2220/34 (2013.01); F05D 2240/301 (2013.01); F05D 2240/303 (2013.01); F05D 2250/14 (2013.01); F05D 2250/44 (2013.01)

(58) Field of Classification Search
CPC ........ F02C 3/067; F02C 3/073; B64D 41/007; B64D 27/12; F05D 2220/34; F01D 15/10
See application file for complete search history.

(56) References Cited

U.S. PATENT DOCUMENTS

| 1,076,654 | A | 10/1913 | Kuhlmann |
| 1,263,473 | A | 4/1918 | Schellens |
| 1,361,277 | A | 12/1920 | Mott |
| 2,169,232 | A | 8/1939 | Flanders |
| 2,398,113 | A | 4/1946 | Parrish |
| 2,592,227 | A | 4/1952 | Clifton |
| 3,000,401 | A | 9/1961 | Ringleb |
| 3,037,742 | A | 6/1962 | Dent et al. |
| 3,070,284 | A | 12/1962 | Kent |
| 3,076,510 | A * | 2/1963 | Piel ..................... B64D 41/007 |
| | | | 415/4.1 |
| 3,494,539 | A | 2/1970 | Littleford |
| 3,604,663 | A | 9/1971 | Custer |
| 3,664,612 | A | 5/1972 | Skidmore et al. |
| 3,750,689 | A | 8/1973 | Britt |
| 3,807,663 | A | 4/1974 | Bartoe |

(Continued)

FOREIGN PATENT DOCUMENTS

| AU | 676782 | 3/1997 |
| CN | 102022258 | 4/2011 |

(Continued)

OTHER PUBLICATIONS

International Search Report and Written Opinion dated Apr. 5, 2024 in PCT application No. PCT/US2024/016806.

(Continued)

*Primary Examiner* — Justin D Seabe
(74) *Attorney, Agent, or Firm* — Plumsea Law Group, LLC

(57) ABSTRACT

A ram air turbine may include an output shaft, a first turbine blade set configured to rotate in a first direction, and a second turbine blade set configured to counter-rotate with respect to the first turbine blade set. The rotation of the first turbine blade set and the counter-rotation of the second turbine blade set drives the output shaft.

20 Claims, 22 Drawing Sheets

(56) References Cited

U.S. PATENT DOCUMENTS

| | | | |
|---|---|---|---|
| 3,830,450 A | 8/1974 | Williams | |
| 3,908,683 A | 9/1975 | Demetrick | |
| 3,929,369 A | 12/1975 | Blair | |
| 3,937,238 A | 2/1976 | Stewart et al. | |
| 3,999,797 A | 12/1976 | Kirsch | |
| 4,021,135 A | 5/1977 | Pedersen et al. | |
| 4,236,866 A | 12/1980 | Zapata | |
| 4,240,250 A | 12/1980 | Harris | |
| 4,318,565 A | 3/1982 | Lay | |
| 4,434,957 A | 3/1984 | Moritz | |
| 4,565,491 A | 1/1986 | Ivanov et al. | |
| 4,603,898 A | 8/1986 | Udagawa | |
| 4,611,796 A | 9/1986 | Orr | |
| 4,674,788 A | 6/1987 | Ohmura | |
| 4,772,062 A | 9/1988 | Janssen | |
| 4,822,249 A | 4/1989 | Eckardt et al. | |
| 4,975,023 A | 12/1990 | Miura et al. | |
| 5,106,147 A | 4/1992 | Okada | |
| 5,316,443 A | 5/1994 | Smith | |
| 5,324,092 A | 6/1994 | Burg | |
| 5,356,195 A | 10/1994 | Kanda | |
| 5,382,070 A | 1/1995 | Turner | |
| 5,588,804 A | 12/1996 | Neely | |
| 5,645,403 A | 7/1997 | Bogage | |
| 5,988,980 A | 11/1999 | Busbey | |
| 6,183,041 B1 | 2/2001 | Wilson | |
| 6,210,116 B1 | 4/2001 | Kuczaj et al. | |
| 6,430,917 B1 | 8/2002 | Platts | |
| 6,454,535 B1 | 9/2002 | Goshorn | |
| 6,494,673 B2 | 12/2002 | Choy | |
| 6,534,608 B2 | 3/2003 | Peterson | |
| 6,692,232 B1 | 2/2004 | Letourneau | |
| 6,807,802 B2 | 10/2004 | Platts | |
| 6,870,280 B2 | 3/2005 | Pechler | |
| 7,329,965 B2 | 2/2008 | Roberts | |
| 7,390,163 B2 | 6/2008 | Clauson | |
| 7,435,051 B2 | 10/2008 | Obinelo et al. | |
| 7,484,925 B2 | 2/2009 | Carlson | |
| 7,494,325 B2 | 2/2009 | Gustafson et al. | |
| 7,695,242 B2 | 4/2010 | Fuller | |
| 7,758,303 B1 | 7/2010 | Wadia | |
| 8,091,951 B1 | 1/2012 | Fitzgerald | |
| 8,118,560 B2 | 2/2012 | Takahashi et al. | |
| 8,192,141 B1 | 6/2012 | Dale | |
| 8,402,742 B2 | 3/2013 | Roberge et al. | |
| 8,491,036 B2 | 7/2013 | Henderson et al. | |
| 8,500,291 B2 | 8/2013 | Wulff et al. | |
| 8,550,786 B2 | 10/2013 | Janiuk | |
| 8,667,773 B2 | 3/2014 | Silkowski | |
| 8,672,622 B2 | 3/2014 | Ohya et al. | |
| 8,678,310 B2 * | 3/2014 | Masoudipour | B64D 41/007 |
| | | | 290/44 |
| 8,684,447 B2 | 4/2014 | Henderson et al. | |
| 8,733,954 B2 | 5/2014 | Wulff et al. | |
| 8,783,757 B2 | 7/2014 | Henderson et al. | |
| 8,789,365 B2 | 7/2014 | Maier | |
| 8,790,079 B2 | 7/2014 | Tersmette et al. | |
| 8,801,359 B2 | 8/2014 | Sherrer | |
| 8,882,028 B2 * | 11/2014 | Chase | B64D 41/00 |
| | | | 290/55 |
| 8,973,974 B2 | 3/2015 | Kunkel | |
| 9,056,636 B2 | 6/2015 | Henderson et al. | |
| 9,205,778 B2 | 12/2015 | Henderson et al. | |
| 9,261,073 B2 | 2/2016 | Blake et al. | |
| 9,410,430 B2 * | 8/2016 | Haskin | F01D 5/03 |
| 9,428,228 B2 | 8/2016 | Henderson et al. | |
| 9,534,608 B2 | 1/2017 | Gehlot et al. | |
| 9,616,945 B1 | 4/2017 | Henderson et al. | |
| 9,670,783 B2 | 6/2017 | Huebner et al. | |
| 9,670,840 B2 | 6/2017 | Plante | |
| 9,682,735 B2 | 6/2017 | Bacon | |
| 9,695,799 B2 | 7/2017 | Aihara | |
| 9,803,649 B2 | 10/2017 | Ragg et al. | |
| 9,932,959 B2 | 4/2018 | Al-Shibl | |
| 9,957,000 B1 | 5/2018 | Ehirim | |
| 9,957,060 B2 * | 5/2018 | Riordan | F03D 9/00 |
| 10,030,520 B2 | 7/2018 | Duchene | |
| 10,059,385 B1 | 8/2018 | Henderson et al. | |
| 10,173,784 B2 * | 1/2019 | Stewart | B64D 41/00 |
| 10,415,543 B2 | 9/2019 | Nemoto | |
| 10,619,483 B2 | 4/2020 | Voytovych | |
| 10,766,544 B2 * | 9/2020 | Suk | F04D 29/681 |
| 11,040,745 B2 | 6/2021 | Chen | |
| 11,060,406 B2 | 7/2021 | Zeinalov | |
| 11,155,343 B2 | 10/2021 | Jasklowski | |
| 11,390,333 B2 | 7/2022 | Suk | |
| 11,673,617 B2 | 6/2023 | Suk | |
| 2003/0071485 A1 | 4/2003 | Kazama | |
| 2005/0029835 A1 | 2/2005 | Adams | |
| 2006/0169847 A1 | 8/2006 | Konings | |
| 2006/0232102 A1 | 10/2006 | Steel | |
| 2006/0233647 A1 | 10/2006 | Saunders | |
| 2007/0012026 A1 | 1/2007 | Dev | |
| 2007/0022738 A1 | 2/2007 | Norris | |
| 2007/0224029 A1 | 9/2007 | Yokoi | |
| 2008/0093886 A1 | 4/2008 | Nusbaum | |
| 2008/0124211 A1 | 5/2008 | Suciu | |
| 2009/0167030 A1 | 7/2009 | Watkins | |
| 2009/0169386 A1 | 7/2009 | Suciu et al. | |
| 2009/0246027 A1 | 10/2009 | Johnson | |
| 2011/0033280 A1 | 2/2011 | Justak | |
| 2011/0057452 A1 | 3/2011 | Interlandi | |
| 2011/0181072 A1 | 7/2011 | Kempster | |
| 2013/0048780 A1 * | 2/2013 | Masoudipour | F02C 7/32 |
| | | | 244/58 |
| 2013/0076064 A1 | 3/2013 | Smith | |
| 2013/0106136 A1 | 5/2013 | Smith | |
| 2014/0290259 A1 | 10/2014 | Plante | |
| 2015/0008699 A1 | 1/2015 | Yamaguchi | |
| 2015/0158439 A1 | 6/2015 | Zha | |
| 2015/0353149 A1 | 12/2015 | Wolf | |
| 2016/0016616 A1 | 1/2016 | Bacon | |
| 2016/0016618 A1 | 1/2016 | Wolf | |
| 2016/0031496 A1 | 2/2016 | Zha | |
| 2016/0258442 A1 | 9/2016 | Helton et al. | |
| 2016/0273372 A1 | 9/2016 | Podgorski et al. | |
| 2016/0298646 A1 | 10/2016 | Subramaniyan | |
| 2017/0080770 A1 | 3/2017 | Irwin | |
| 2017/0158262 A1 | 6/2017 | Shami | |
| 2017/0167275 A1 | 6/2017 | Schroeder et al. | |
| 2017/0334491 A1 | 11/2017 | Dieckmann | |
| 2018/0022403 A1 | 1/2018 | Fahland | |
| 2018/0093714 A1 | 4/2018 | Chen | |
| 2018/0093741 A1 | 4/2018 | Chen | |
| 2018/0134331 A1 | 5/2018 | Yoon | |
| 2018/0312203 A1 | 11/2018 | Smith | |
| 2019/0084629 A1 | 3/2019 | Prince | |
| 2019/0093629 A1 | 3/2019 | Juarez | |
| 2019/0202503 A1 | 7/2019 | Suk et al. | |
| 2020/0207426 A1 | 7/2020 | Motter | |
| 2020/0270995 A1 | 8/2020 | Maar | |
| 2020/0377158 A1 | 12/2020 | Cunningham | |
| 2020/0398908 A1 | 12/2020 | Suk | |
| 2020/0406988 A1 | 12/2020 | Bradley | |
| 2021/0001929 A1 | 1/2021 | Baxter | |
| 2021/0139084 A1 | 5/2021 | Pan | |
| 2021/0403100 A1 | 12/2021 | Hussein | |
| 2022/0348270 A1 | 11/2022 | Suk et al. | |
| 2023/0399063 A1 | 12/2023 | Sostaric | |

FOREIGN PATENT DOCUMENTS

| | | | |
|---|---|---|---|
| CN | 105480311 | 4/2016 | |
| CN | 105934333 | 9/2016 | |
| CN | 106050335 | 10/2016 | |
| CN | 106704259 | 5/2017 | |
| CN | 107013248 | 8/2017 | |
| CN | 114893342 A * | 8/2022 | F03D 3/005 |
| DE | 322283 C | 6/1920 | |
| DE | 102013101296 | 8/2014 | |
| DE | 102013105843 | 12/2014 | |
| DE | 102013217110 | 3/2015 | |
| DE | 102019000358 | 7/2020 | |
| EP | 76706 | 4/1983 | |

(56) References Cited

FOREIGN PATENT DOCUMENTS

| EP | 257341 | 3/1988 | | |
|---|---|---|---|---|
| GB | 2608481 | 1/2023 | | |
| JP | H03286189 A | * 12/1991 | ............ | Y02E 10/72 |
| JP | 05338562 | 12/1993 | | |
| KR | 101783194 | 10/2017 | | |
| WO | WO 2017156135 | 9/2017 | | |

OTHER PUBLICATIONS

Office Action mailed Jan. 16, 2020 in U.S. Appl. No. 15/969,347.
Office Action mailed Dec. 6, 2021 in U.S. Appl. No. 17/008,846.
Office Action mailed Oct. 21, 2022 in U.S. Appl. No. 17/841,945.
Office Action mailed Dec. 13, 2023 in U.S. Appl. No. 18/321,448.
International Search Report and Written Opinion issued May 8, 2019 for Application No. PCT/US2018/67639.
Office Action dated Jan. 19, 2022 in Chinese Application No. 2018800900887.
Office Action dated Jul. 22, 2022 in Chinese Application No. 2018800900887.
Extended European Search Report dated Dec. 23, 2021 in European Application No. 18894327.8.
Extended European Search Report dated Jan. 19, 2024 in European Application No. 23203726.7.
Office Action dated Nov. 23, 2021 in Korean Application No. 10-2020-7021710.
Office Action dated Oct. 13, 2022 in Korean Application No. 10-2022-7028792.
International Search Report and Written Opinion dated Jun. 18, 2024 in PCT application No. PCT/US2024/016809.
International Search Report and Written Opinion dated Jun. 17, 2024 in PCT application No. PCT/US2024/016812.
Office Action mailed Sep. 3, 2024 in U.S. Appl. No. 18/173,760.
Final Office Action mailed Jan. 8, 2025 in U.S. Appl. No. 18/173,760.
Office Action mailed Apr. 3, 2025 in U.S. Appl. No. 18/363,954.
International Search Report and Written Opinion dated Oct. 9, 2024 in PCT Application No. PCT/US2024/031915.

* cited by examiner

RAM AIR TURBINE

BACKGROUND OF THE INVENTION

The present invention relates generally to a ram air turbine (RAT) and, more specifically, to a ram air turbine including counter-rotating turbine blade sets implementing turbine blades having a hooked cross-sectional airfoil shape.

In the aircraft industry, a ram air turbine is a small wind turbine that is connected to a hydraulic pump, or electrical generator, installed in an aircraft and used as a power source. The ram air turbine generates power from the airstream by ram pressure due to the speed of the aircraft. Modern aircraft generally use ram air turbines only in an emergency. In case of the loss of both primary and auxiliary power sources the ram air turbine will power vital systems (e.g., flight controls, linked hydraulics, and certain instrumentation). Some ram air turbines produce hydraulic power, which is in turn used to power one or more electrical generators. In some cases, ram air turbines drive electric power generators. The electrical power from such generators may be used to drive hydraulic pumps and to power various electrical systems of the aircraft.

In normal (i.e., non-emergency) conditions, the ram air turbine is typically retracted into the fuselage (or wing) of the aircraft, and is deployed manually or automatically as needed, e.g., following complete loss of power. In the time between power loss and ram air turbine deployment.

Many modern types of commercial airliners are equipped with ram air turbines. A typical large ram air turbine on a commercial aircraft can be capable of producing, depending on the generator, from 5 to 70 KW. Smaller, low airspeed models may generate as little as 400 watts. The amount of power that the ram air turbine is configured to generate may depend on the amount of electrical and/or hydraulic power required to operate the basic systems of the aircraft. The size and configuration of the ram air turbine may be selected to provide the desired amount of power. The Airbus A380 has a relatively large ram air turbine propeller at 1.63 meters (5.3 ft) in diameter. A more typical size is around 80 centimeters (2.6 ft) in diameter.

In order to produce the power required to satisfy the electrical and hydraulic needs to maintain control of an aircraft, typical ram air turbines need to be relatively large, particularly for large aircraft. The large size limits the placement of these ram air turbines on the aircraft. It is desirable to place the ram air turbine in areas where the air stream around the aircraft is the fastest and/or smoothest. However, not all areas of fast/smooth moving air stream are suited for placement of a large ram air turbine. Accordingly, the options for placement of typical large size ram air turbines are limited.

The large size of such ram air turbines also makes them relatively heavy. In addition, the mechanisms that deploy these ram air turbines into the air stream around the aircraft are also heavy. Weight is always a significant consideration in aircraft design. Accordingly, it is desirable to reduce the weight of ram air turbines.

SUMMARY OF THE INVENTION

The present disclosure is directed to a ram air turbine with a high efficiency such that desired output is achieved with a smaller and/or lighter weight ram air turbine. Such a ram air turbine may implement a plurality of counter-rotating turbine blade sets. In addition, the blades of the turbine blade sets utilize a hooked cross-sectional shape. Further, the ram air turbine may be fixedly installed inside the body shell of the aircraft and air diverted to it in order to eliminate the need for a ram air turbine deployment mechanism.

In one aspect, the present disclosure is directed to a ram air turbine including an output shaft, a first turbine blade set configured to rotate in a first direction, and a second turbine blade set configured to counter-rotate with respect to the first turbine blade set. The rotation of the first turbine blade set and the counter-rotation of the second turbine blade set drive the output shaft.

In another aspect, the present disclosure is directed to a ram air turbine. The ram air turbine may include a plurality of turbine blades having the shape of an airfoil. The airfoil may include a leading edge and a trailing edge, a suction side and a pressure side, a base portion including a first surface associated with the pressure side and a second surface associated with the suction side, an overhang portion that extends over some of the base portion, and an elliptic portion connecting the base portion and the overhang portion adjacent the leading edge. The overhang portion is curved toward the second surface of the base portion.

In another aspect, the present disclosure is directed to an aircraft. The aircraft may include a body shell having an air inlet and an air outlet arranged spaced from one another in the direction of aircraft flight. The aircraft may also include a ram air turbine system. The ram air turbine system may include a ram air turbine fixedly housed inside the body shell of the aircraft, an intake conduit configured to guide air from the air inlet in the body shell to the ram air turbine, and an outlet conduit configured to guide air exiting the ram air turbine to the air outlet in the body shell.

Other systems, methods, features, and advantages of the invention will be, or will become, apparent to one of ordinary skill in the art upon examination of the following figures and detailed description. It is intended that all such additional systems, methods, features, and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The present disclosure is directed to a ram air turbine (RAT) implementing counter-rotating turbine blade sets. In some embodiments, the turbine blade sets may include airfoil blades having a hooked cross-sectional shape. The turbine blades of the disclosed embodiments may implement one or more airfoil shapes described in Suk et al., U.S. Pat. No. 10,766,544, issued on Sep. 8, 2020, and entitled "Airfoils and Machines Incorporating Airfoils," the entire disclosure of which is incorporated herein by reference.

As used herein, the term "airfoil" (or "aerofoil") is any structure with curved surfaces that produces an aerodynamic force when moved through a fluid. As used herein, the term "fluid" may refer to any Newtonian Fluid. In other embodiments, airfoils could be used with Non-Newtonian Fluids.

An airfoil may include an upper or suction surface against which fluid flows at a relatively high velocity with low static pressure. An airfoil may also include a lower or pressure surface that has a high static pressure relative to the suction surface. Alternatively, the suction and pressure surfaces could be referred to as suction and pressure sides. The airfoil also includes a leading edge defined as the point at the front of the airfoil with maximum curvature. The airfoil also includes a trailing edge defined as the point at the rear of the airfoil with minimum curvature. In addition, a chord line of the airfoil refers to a straight line between the leading and trailing edges. Also, a mean camber line is the locus of points midway between the upper and lower surfaces and may or may not correspond with the chord line depending on the shape of the airfoil.

As used herein, an airfoil has a chord length defined as the length of the airfoil's chord line. In addition, the airfoil has a thickness defined as the distance between the upper and lower surfaces along a line perpendicular to the mean camber line. The width of an airfoil is taken in a direction perpendicular to both the chord line and the thickness.

Throughout the specification and claims the term "radius of curvature" is used. The radius of curvature is the reciprocal of the curvature at a particular location on a curve or two-dimensional surface. For a curve, the radius of curvature equals the radius of the circular arc that best approximates the curve at that point. In particular, it should be noted that the larger the radius of curvature of a curve, the smaller the curvature (and vice versa).

Figure 1:
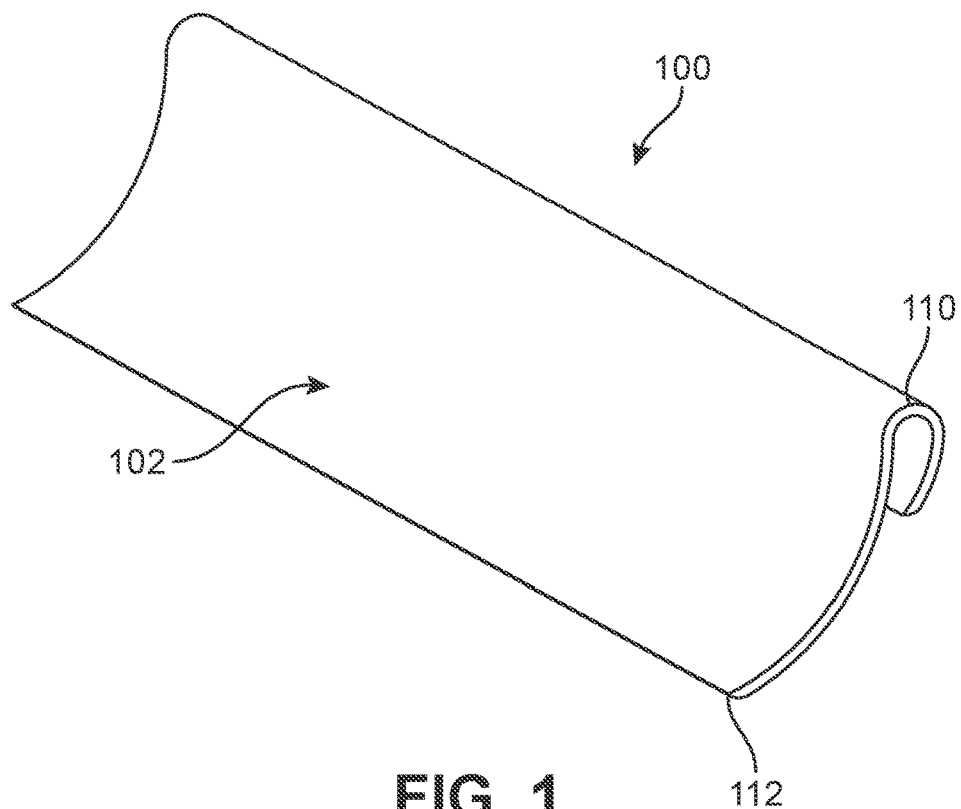
FIG. 1 is a schematic isometric view of an embodiment of an airfoil along the pressure side.
Figure 2:
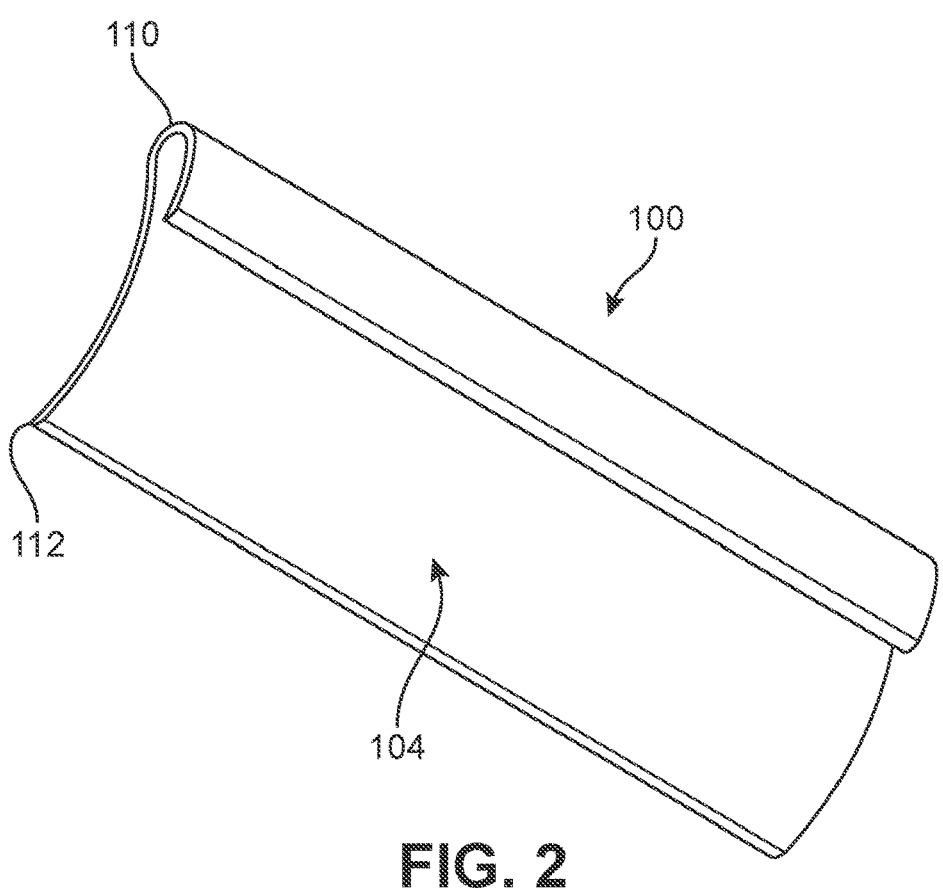
FIG. 2 is a schematic isometric view of a suction side of the airfoil of FIG. 1.
Figure 3:
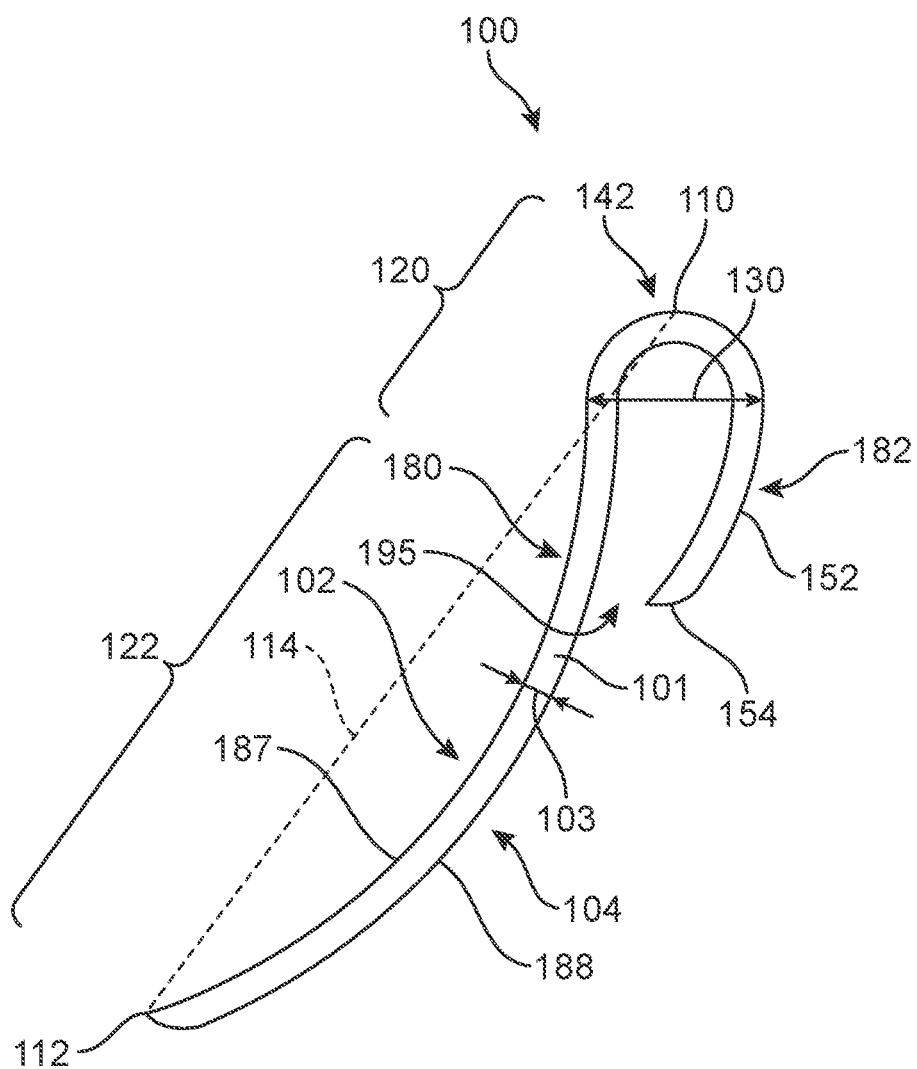
FIG. 3 is a schematic side view of an embodiment of an airfoil.

FIGS. 1-2 illustrate schematic isometric views of an airfoil (or blade) 100, while FIG. 3 illustrates a schematic side view of airfoil 100. Referring to FIGS. 1-3, airfoil 100 is comprised of a pressure side 102 (shown in FIG. 1) and an opposing suction side 104 (shown in FIG. 2). Each of these sides includes a surface (e.g., a pressure surface or a suction surface) in contact with air during operation. Additionally, airfoil 100 includes a leading edge 110 and a trailing edge 112. Moreover, leading edge 110 and trailing edge 112 are connected by a chord line 114 (see FIG. 3).

Referring to FIG. 3, in some embodiments, airfoil 100 may be comprised of a single body 101 of material. In some embodiments, airfoil 100 may be formed of a single unitary piece of material. Starting from trailing edge 112, body 101 includes a base portion 180 that is seen to curve gradually through the length of airfoil 100. Base portion 180 includes first a surface 187 on pressure side 102 of airfoil 100 and an opposing second surface 188 on opposing suction side 104.

At the end of base portion 180, body 101 bends to create a folded or hook-like section adjacent leading edge 110. That is, adjacent leading edge 110, body 101 is comprised of an elliptic portion 142 as well as an overhang portion 182 that hangs or extends over some of base portion 180. Elliptic portion 142 connects base portion 180 and overhang portion 182 and also includes leading edge 110.

In some embodiments, overhang portion 182 may be spaced apart or separated from base portion 180. In the embodiment of FIG. 3, overhang portion 182 is separated from base portion 180 by gap 195. In different embodiments, the size of gap 195 may vary. In some cases, gap 195 may be greater than or equal to a thickness of overhang portion 182. In some cases, gap 195 may be at least three times as large as a thickness of overhang portion 182. The size of gap 195, and thus, the spacing of overhang portion 182 from base portion 180, determines the airflow behavior across airfoil 100. Accordingly, as discussed in further detail below, gap 195 may be sized accordingly to provide the desirable airflow behavior.

The fold in body 101 adjacent leading edge 110 may be seen to divide airfoil 100 into two portions having distinctive geometries: a leading airfoil portion 120 and a trailing airfoil portion 122. As shown in FIG. 3, leading airfoil portion 120 is formed by the elliptic portion 142, the overhang portion 182, and the leading segment of base portion 180. Trailing airfoil portion 122 is formed by the trailing segment of base portion 180.

In different embodiments, the length of leading airfoil portion relative to the overall length of the airfoil (that is, the percent of the total airfoil length that the overhang portion extends over) can vary. In some cases, the leading airfoil portion has a relative length of 25 to 50 percent of the total airfoil length. In one embodiment, the leading airfoil portion has a length of at least 25 percent of the total airfoil length. In yet another embodiment, the leading airfoil portion has a length of at least one third of the total airfoil length. In some cases, the leading airfoil portion may made sufficiently long enough (at least 25 percent or so of the total airfoil length) so that the first arc portion can be gradually curved down towards the second arc portion, thereby helping to keep the boundary layer attached to the airfoil before the dramatic step down in thickness adjacent the second arc portion.

As seen in FIG. 3, body 101 has a relatively constant local thickness 103 throughout airfoil 100. However, the folded shape of body 101 that forms overhang portion 182 provides a greater overall thickness through leading airfoil portion 120 than in trailing airfoil portion 122. Here, the overall thickness is measured between opposing suction side 104 and pressure side 102 and is distinct from the local body thickness. Specifically, leading airfoil portion 120 has variable thickness 130 with a maximum value adjacent leading edge 110 and a minimum value at a location furthest from leading edge 110. In contrast, trailing airfoil portion 122 has an approximately constant thickness. In some embodiments, the thickness of trailing airfoil portion 122 is approximately equal to local thickness 103 of body 101. In other embodiments, trailing airfoil portion 122 could also have a variable thickness.

An airfoil may include provisions for keeping airflow "stuck" on the suction surface so that the air can be redirected through a large angle (e.g., from a near horizontal direction for incoming air to a near vertical direction for outgoing air). In some embodiments, an airfoil can include a leading airfoil portion that includes one or more arcs for controlling the flow of air along a suction surface.

In some embodiments, overhang portion 182 may be further comprised of a first arc portion 152 and a second arc portion 154. First arc portion 152 may extend from elliptic portion 142, while second arc portion 154 may be disposed at an open or free end of overhang portion 182. In some embodiments, the curvature (along opposing suction side 104) of overhang portion 182 may vary from first arc portion 152 to second arc portion 154. In some cases, first arc portion 152 may be configured to curve down in the direction of base portion 180. Moreover, second arc portion 154 may be configured with steeper curvature that is also directed downwardly toward base portion 180.

In the following description the radius of curvature of various surfaces is defined relative to the length of a unit radius, denoted as "UN." In different embodiments, the particular value of the length of the unit radius could vary. For example, the unit radius could have a length of 100 mm (i.e., 1 UN=100 mm), 6 inches (i.e., 1 UN=6 inches), or any other value. It may be understood that the ratio of two radii of curvature is independent of the particular value of the unit radius. Thus, if a first surface has a radius of curvature of 1 UN and a second surface has a radius of curvature of 0.5 UN, the ratio is equal to 1 divided by 0.5, or 2, and is a dimensionless quantity that is independent of the particular length of the unit radius in a given embodiment.

Figure 4:
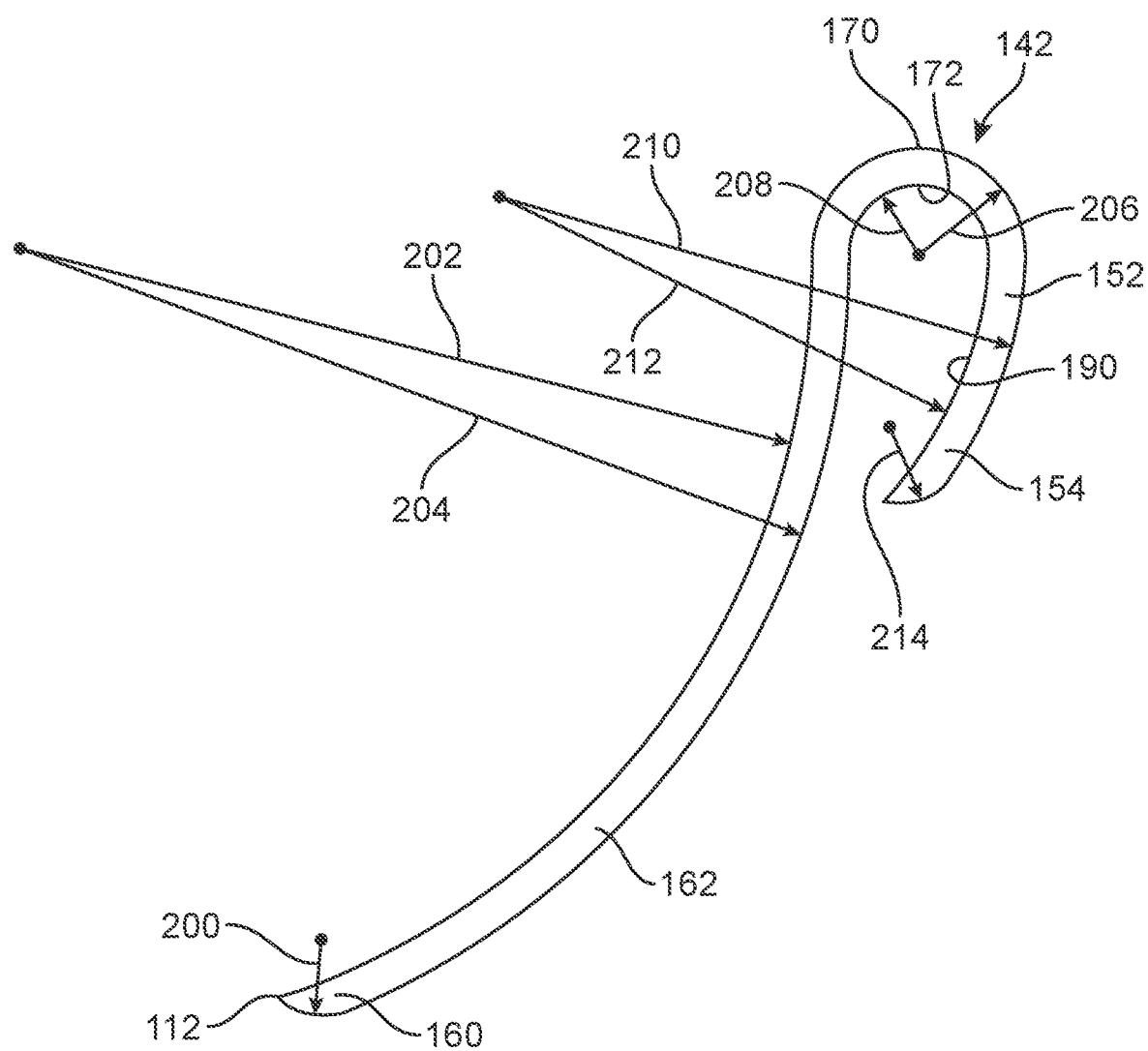
FIG. 4 is a schematic side view of the airfoil of FIG. 3, in which the curvature of various portions of the airfoil are indicated.

FIG. 4 is a schematic side view of airfoil 100. Referring to FIG. 4, the different portions or segments of airfoil 100 can have different degrees of curvature. In some embodiments, trailing airfoil portion 122 has a trailing arc portion 160 immediately adjacent trailing edge 112. Trailing arc portion 160 has a radius of curvature 200. In some cases, radius of curvature 200 could have a value of approximately 0.1000 UN. In some embodiments, main segment 162 of trailing airfoil portion 122 has a radius of curvature 202 along pressure side 102 and a radius of curvature 204 along opposing suction side 104. In some cases, radius of curvature 202 has a value of approximately 1.1250 UN. In some cases, radius of curvature 204 has a value of approximately 1.1750 UN. In some embodiments, elliptic portion 142 has a radius of curvature 206 on outward facing side 170 and a radius of curvature 208 on inward facing side 172. In some cases, radius of curvature 206 has a value of approximately 0.1500 UN. In some cases, radius of curvature 208 has a value of approximately 0.1000 UN.

In some embodiments, first arc portion 152 has a radius of curvature 210 along opposing suction side 104 and a radius of curvature 212 along inward facing surface 190. In some cases, radius of curvature 210 has a value of approximately 0.7500 UN. In some cases, radius of curvature 212 has a value of approximately 0.7000 UN. In addition, second arc portion 154 has a radius of curvature 214. In some cases, radius of curvature 214 has a value of approximately 0.1000 UN.

In some embodiments, the curvature of each segment of airfoil 100 may be selected to help keep the boundary layer of flowing air attached to opposing suction side 104, even as airfoil 100 curves from leading edge 110 to trailing edge 112.

Figure 5:
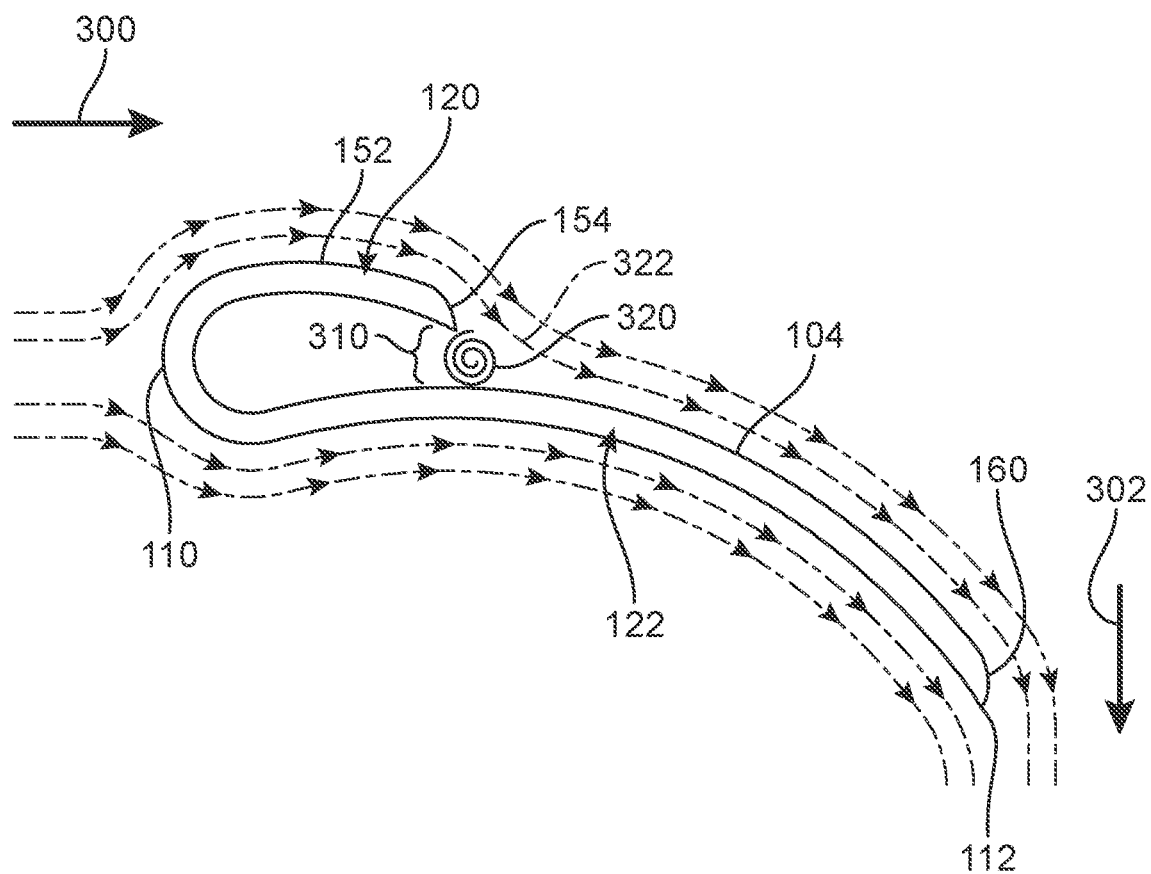
FIG. 5 is a schematic view of an embodiment of an airfoil indicating pathlines of airflow elements.

FIG. 5 is a schematic view of airfoil 100 in operation as air passes across it. Referring to FIG. 5, incoming air flows in a first direction 300 and encounters leading edge 110 first. Air moving across opposing suction side 104 will first pass across first arc portion 152, which curves to second arc portion 154. Air then gets directed into trailing airfoil portion 122. As the air flows along trailing airfoil portion 122, it is directed to trailing arc portion 160 and turns as it leaves trailing edge 112.

The geometry of leading airfoil portion 120 creates step-down region 310 resulting in an abrupt change in thickness between leading airfoil portion 120 and trailing airfoil portion 122. This sudden change in thickness (and geometry) creates vortex 320 (and/or turbulent eddies) at step-down region 310. As air flows over opposing suction side 104, vortex 320 "pulls" the air toward the airfoil and thereby reattaches the boundary layer of the flow as it moves from one section of the airfoil to the next, keeping the air "stuck" on opposing suction side 104.

The embodiments utilize specifically curved arc portions adjacent step-down region 310 to help actively control the turbulent eddies or vortices that develop at step-down region 310. Specifically, first arc portion 152 and second arc portion 154 combine to actively redirect the fluid flow with use of the Coandă effect toward reattachment to the airfoil surface. The Coandă effect refers to the tendency of a jet of fluid emerging from an orifice to follow an adjacent flat or curved surface and to entrain fluid from the surroundings so that a region of lower pressure develops. Vortex 320 (and/or turbulent eddies) at step-down region 310 creates a pressure difference between second arc portion 154 and trailing airfoil portion 122. The active fluid flowing across opposing suction side 104 creates an air curtain 322 (via the Coandă effect) that helps hold vortex 320 in place and keeps it attached to opposing suction side 104. Air curtain 322 thus provides a stabilizing force to keep vortex 320 in place, which further serves to prevent the boundary layer from delaminating from airfoil 100.

This arrangement provides an airfoil that keeps the airflow stuck to opposing suction side 104 enough to turn the airflow direction by close to 90 degrees. That is, air initially flowing in first direction 300 as it encounters leading edge 110 leaves trailing edge 112 traveling in a second direction 302. In some cases, second direction 302 may be approximately 90 degrees From first direction 300. Thus, the airfoil will be forced in a direction that is substantially opposite of first direction 302. When the airfoil is included in a rotational turbine blade set, this redirection of airflow, resulting in opposing forces that drive the airfoil in a direction that is substantially 90 degrees From the direction of air flow into which the airfoil is placed, may maximize the amount of rotational energy to which the airflow is converted. This may maximize the amount of electrical power that may be generated by such a turbine blade set. In other embodiments, depending on the shape and local curvature of various segments of airfoil 100, the direction of incoming air could be changed by any amount between approximately 10 and 90 degrees.

In different embodiments, the disclosed airfoils could be manufactured from various materials. Exemplary materials include, but are not limited to, materials known for use in manufacturing turbine blades (e.g., U-500, Rene 77, Rene N5, Rene N6, PWA1484, CMSX-4, CMSX-10, Inconel, GTD-111, EPM-102, Nominic 80a, Niminic 90, Nimonic 105, Nimonic 105 and Nimonic 263). Other materials include ceramic matrix composites. Other materials for airfoils can include, but are not limited to, aluminum, composite materials, steel, titanium as well as other materials.

Airfoils can be manufactured using any known methods. In some embodiments, an airfoil can be formed using an extrusion process.

The dimensions of an airfoil can vary according to its intended application. The chord line length, width, and thickness can all be varied in different ratios while maintaining the general profile shape of the airfoil.

A turbine blade set that implements blades having the airfoil shape described above may be utilized in a ram air turbine. Such a ram air turbine may be configured for use in an aircraft. In some embodiments, the ram air turbine may be fixedly housed inside the body shell of the aircraft. Conduits may direct air from the air stream around the aircraft into the body shell to the internal ram air turbine and back out of the body shell.

Figure 6:
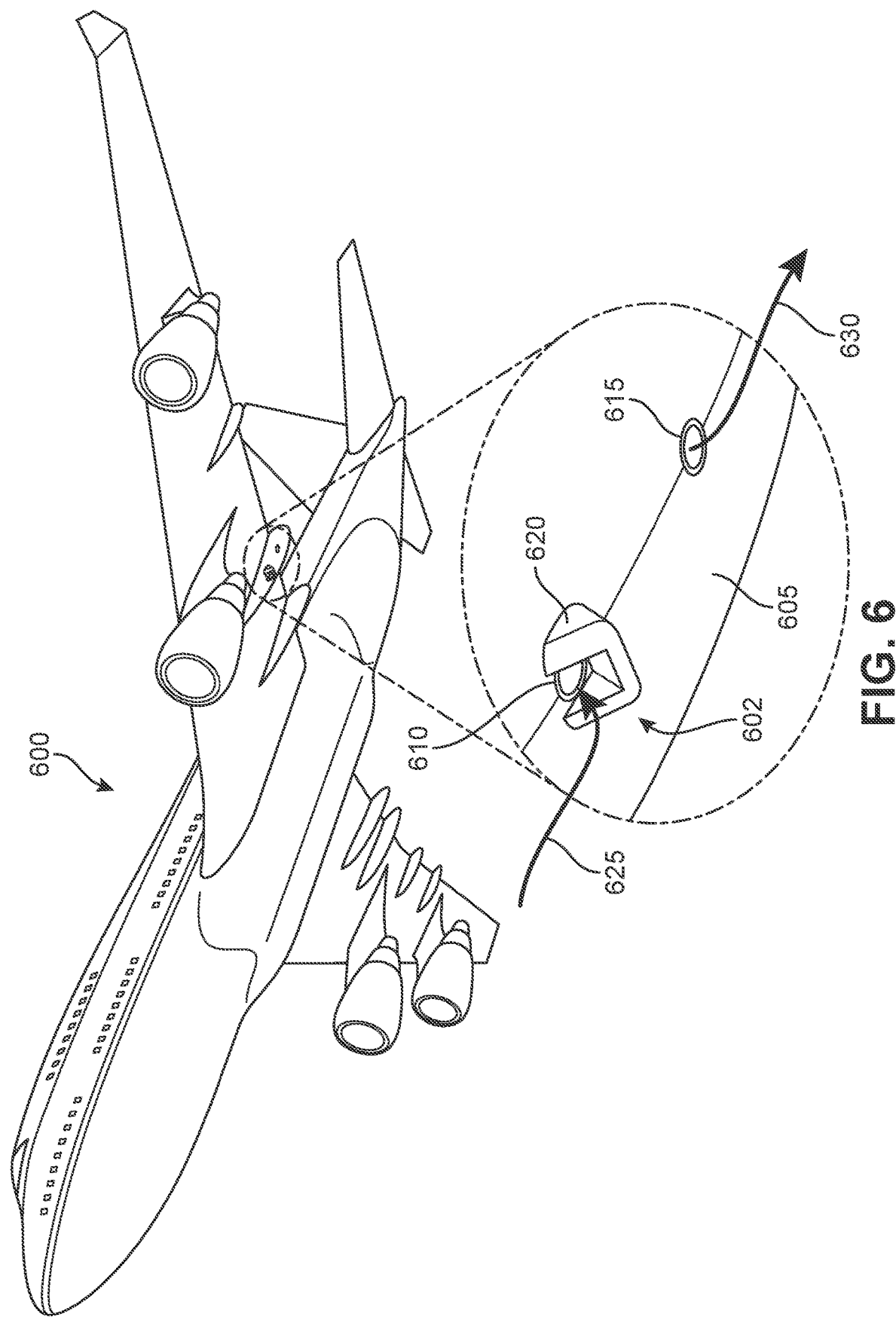
FIG. 6 is a schematic illustration of an aircraft with an enlarged view of externally exposed components of a ram air turbine system.

FIG. 6 is a schematic illustration of an aircraft with an enlarged view of externally exposed components of a ram air turbine system. As shown in FIG. 6, an aircraft 600 may include a ram air turbine system 602. Aircraft 600 may include a body shell 605. System 602 may be located at any suitable location of aircraft 600. For example, in some embodiments, system 602 may be located in the fuselage. In other embodiments, system 602 may be located on a wing. Further, in some embodiments, system 602 may be located in a flap track fairing, as shown in FIG. 6. Air flow adjacent the flap track fairing is typically smooth, and thus, desirable for placement of a ram air turbine system because it produces consistent power, which is favorable for producing stable amounts of hydraulic pressure. It will be understood, however, that other locations may be suitable for the disclosed ram air turbine system.

As shown in FIG. 6, system 602 may include an air inlet 610, into which air from the air stream outside of body shell 605 may flow, as indicated by an arrow 625. Air entering air inlet 610 may be directed to a ram air turbine located inside body shell 605 (see FIG. 7). Air inlet 610 may have any suitable shape to enable smooth flow of air to be delivered to the ram air turbine. Bevels, curves, and other shapes may be used for the surfaces in and around air inlet 610 to affect aerodynamics of the air flow delivered to the ram air turbine. The size of air inlet 610 may be suited to provide air flow to the ram air turbine with the volume, speed, and consistency desired for operation of the ram air turbine.

In some embodiments, additional airflow may be directed into air inlet 610 by an air scoop 620. In some embodiments air scoop 620 may be deployable. Accordingly, in an undeployed position (not shown), air scoop 620 may sit flush, or substantially flush, with the outer surface of body shell 605. In a deployed position, as shown in FIG. 6, air scoop 620 may collect and guide or direct air into air inlet 610. Air scoop 620 may include suitable features to provide air flow at a speed and consistency desired for operation of the ram air turbine. Air scoop 620 may be formed of any suitable material, such as carbon fiber, aluminum, titanium, steel, stainless steel, or any other material with the strength and rigidity to be deployed into the airstream around the aircraft on which it is implemented.

The deployment mechanism of air scoop 620 is not shown. It will be understood that any suitable deployment mechanism may be used for the deployment of air scoop 620, and that skilled artisans will appreciate mechanisms that are suitable for deploying an air scoop into an air stream at a given aircraft speed. Because of the simplicity of air scoop 620 compared to any ram air turbine, the deployment mechanism for air scoop 620 may have a reduced size, weight, and/or complexity compared to deployment mechanisms for ram air turbines.

In addition, as also shown in FIG. 6, body shell 605 may include an air outlet 615. Air exiting the ram air turbine within body shell 605 may be directed out of air outlet 615. Accordingly, to facilitate the air flow through the ram air turbine, air inlet 610 and air outlet 615 may be arranged spaced from one another in the direction of aircraft flight. While the two ports need not necessarily be located directly in line with one another, the air flow through the ram air turbine is facilitated if air inlet 610 is positioned further forward toward the front of aircraft 600 and air outlet 615 is positioned further aft toward the rear of aircraft 600.

Although not shown in FIG. 6, in some embodiments, air outlet 615 may include a closure plate or other structure to close it off when the ram air turbine is not in use. In some cases, operation of the closure plate may be mechanically linked to the deployment of air scoop 620. Other mechanisms to effectuate the opening of the closure plate when needed may also be utilized, such as spring-bias, air pressure, etc.

Figure 7:
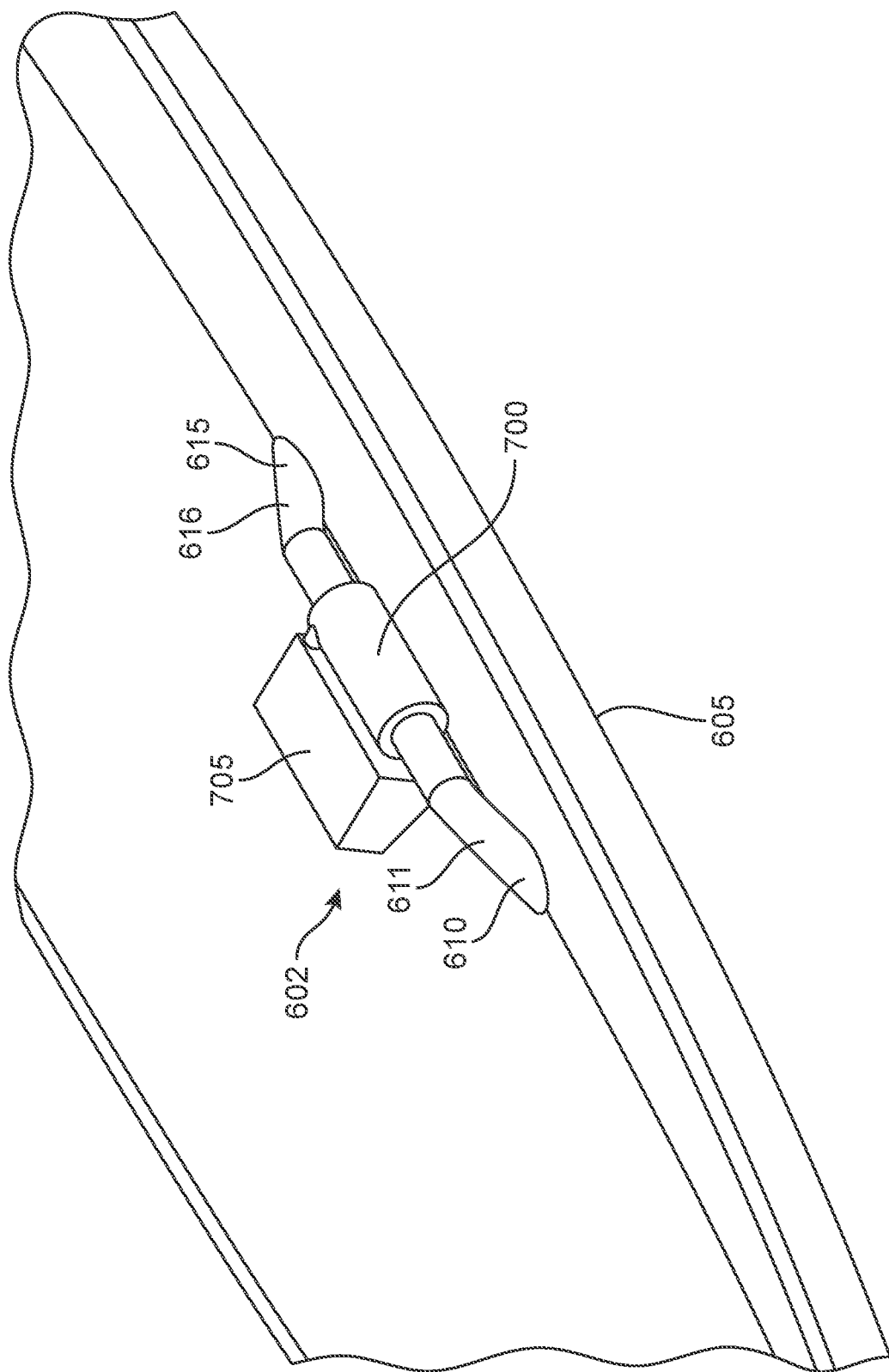
FIG. 7 is a schematic illustration of the inside of an aircraft body shell showing components of a ram air turbine system.

FIG. 7 is a schematic illustration of the inside of aircraft body shell 605 showing components of ram air turbine system 602. As shown in FIG. 7, system 602 may include an intake conduit 611 configured to guide air from air inlet 610 in body shell 605 to a ram air turbine, which may be housed in a ram air turbine housing 700. In addition, system 602 may include an outlet conduit 616 configured to guide air exiting the ram air turbine to air outlet 615 in body shell 605. The shape, size, and material with which air intake conduit 611 and outlet conduit 616 are formed may be selected accordingly to deliver air flow to the ram air turbine in the amount, speed, and smoothness desired.

Thus, in some embodiments, the ram air turbine may be fixedly housed inside body shell 605 of the aircraft. In addition, an electric generator may be associated with, and configured to be driven by, the ram air turbine. Accordingly, a generator housing 705 may be configured to fixedly house the generator inside body shell 605 of the aircraft.

By keeping the ram air turbine inside the aircraft, and only deploying an air scoop, not only may weight be saved because the deployment mechanism for the air scoop is lighter than that of a ram air turbine, but also the deployed air scoop may produce less drag than a ram air turbine that is, itself, deployed into the air stream.

Figure 8:
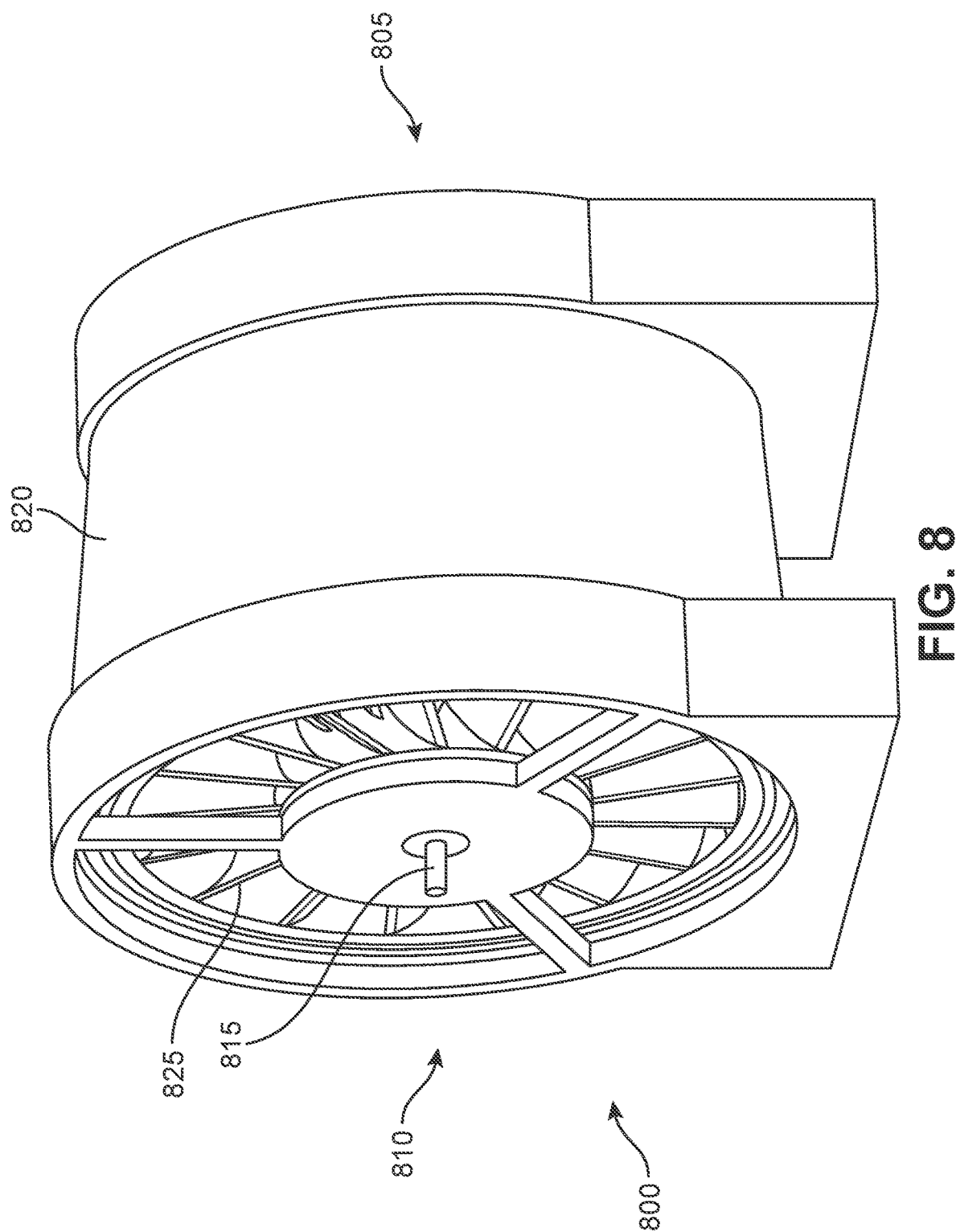
FIG. 8 is a schematic rear view of a ram air turbine according to an exemplary embodiment.

FIG. 8 is a schematic rear view of a ram air turbine 800 according to an exemplary embodiment. As shown in FIG. 8, ram air turbine 800 may have an upstream end 805 and a downstream end 810. Thus, ram air turbine 800 may be configured to receive air flowing through ram air turbine 800 from upstream end 805 to downstream end 810.

In addition, ram air turbine 800 may include an outer housing 820. In some embodiments, outer housing may be tapered. For example, as shown in FIG. 8, outer housing 820 may have a larger diameter at downstream end 810 than at upstream end 805.

FIG. 8 also shows an output shaft 815 configured to be driven by turbine blade sets 825 within outer housing 820. Output shaft 815 may ultimately drive an electric power generator, a hydraulic pump, or both.

Figure 9:
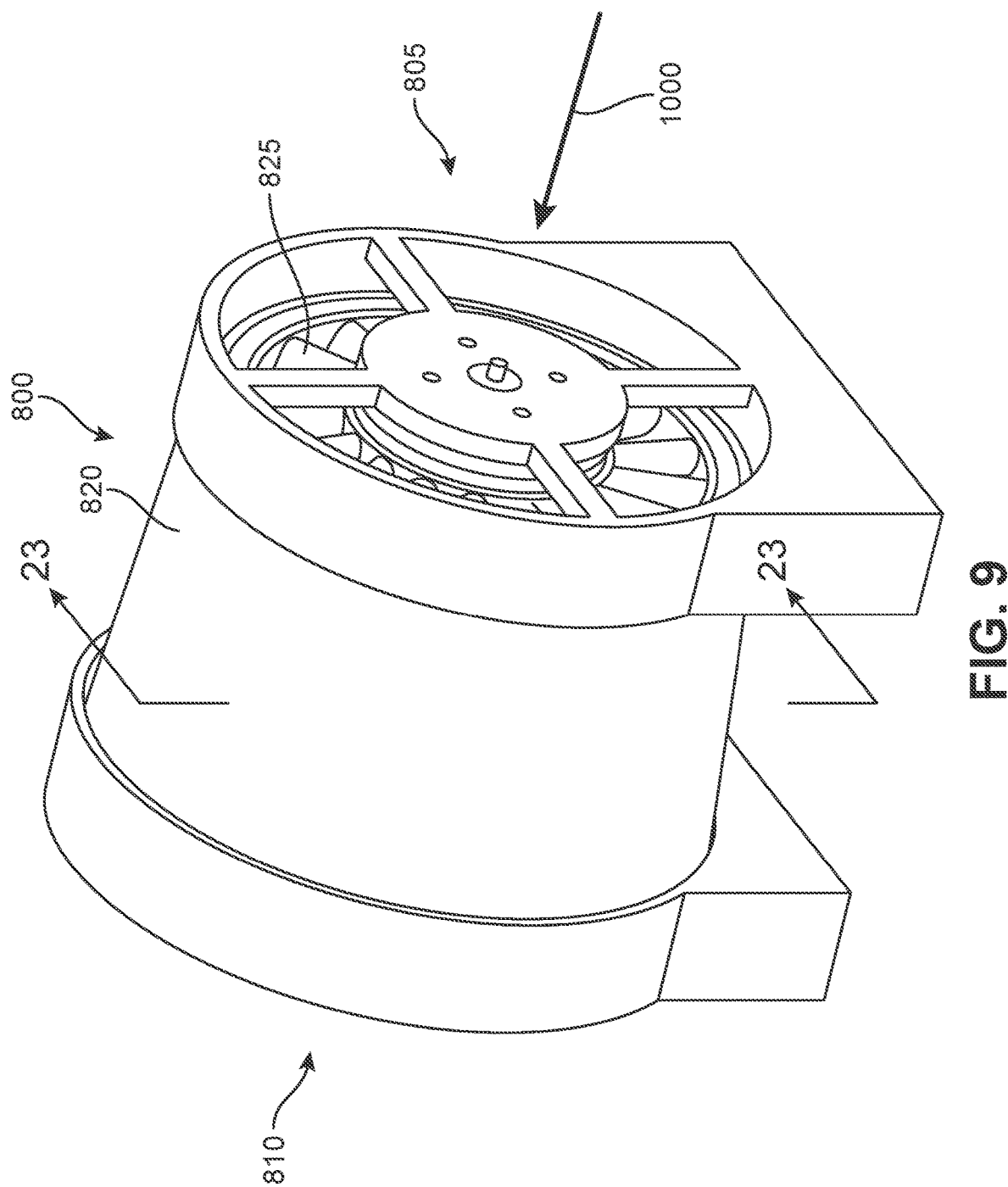
FIG. 9 is a schematic front view of the ram air turbine shown in FIG. 8.

FIG. 9 is a schematic front view of the ram air turbine shown in FIG. 8. As shown in FIG. 9, airflow through ram air turbine 800 proceeds from upstream end 805 to downstream end 810, as indicated by an air flow arrow 1000.

The disclosed ram air turbine may include counter-rotating turbine blade sets. In some embodiments, one or more turbine blade sets may be mounted directly on the output shaft, and one or more other turbine blade sets may be mounted on a case located radially outward of the turbine blade sets. The turbine blade sets mounted on the output shaft may have a diameter that is less than the diameter of the case. Thus, the turbine blade sets mounted on the output shaft may rotate in the opposite direction of the other turbine blade sets mounted on the case. The rotation of the turbine blade sets mounted on the case may be transferred to the output shaft via a planetary gear set.

Figure 10:
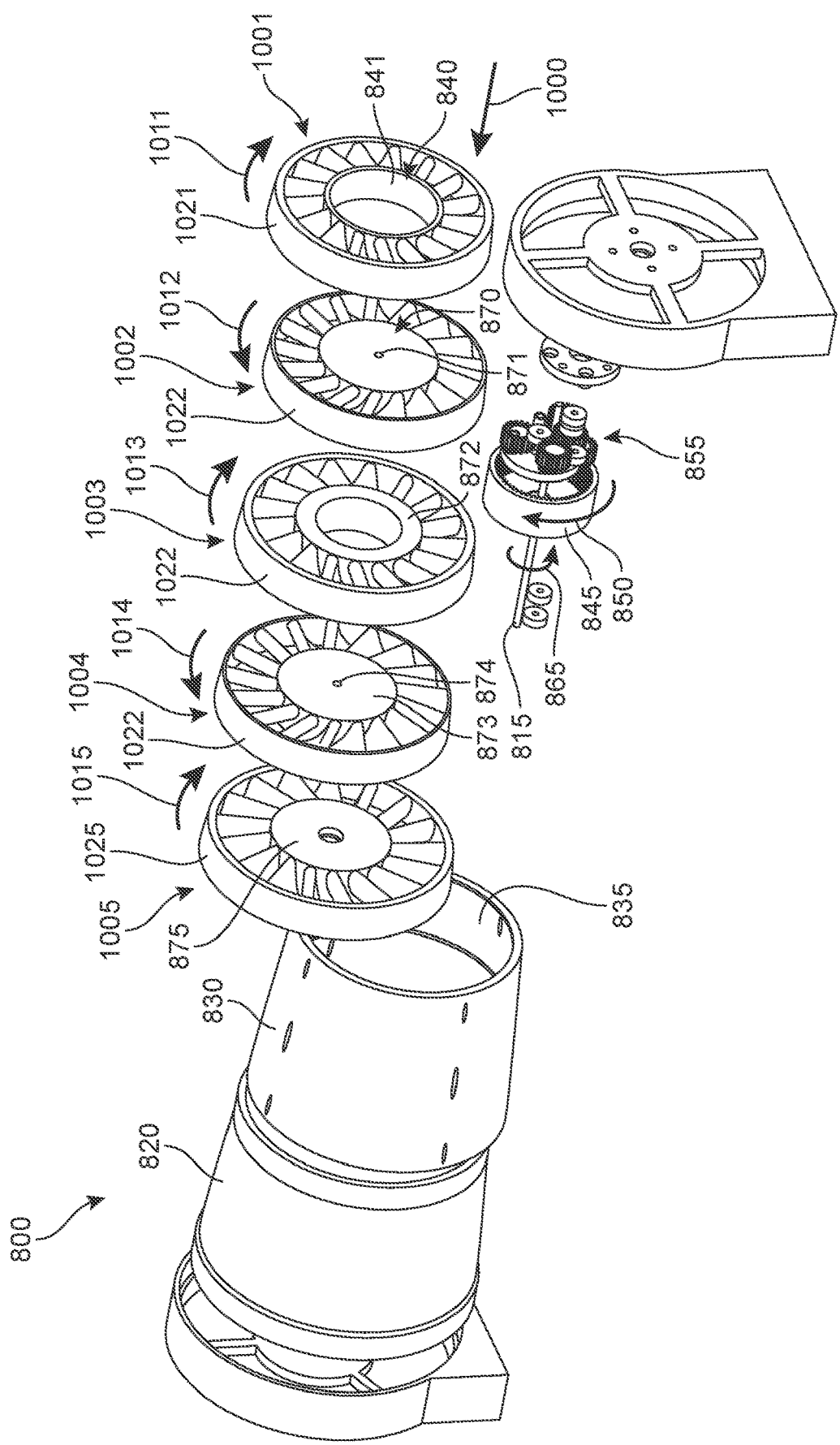
FIG. 10 is a schematic exploded view of the ram air turbine shown in FIG. 8.

FIG. 10 is a schematic exploded view of the ram air turbine shown in FIG. 8. As shown in FIG. 10, ram air turbine 800 may include five turbine blade sets, including a first turbine blade set 1001, a second turbine blade set 1002, a third turbine blade set 1003, a fourth turbine blade set 1004, and a fifth turbine blade set 1005. First turbine blade set 1001 may include a first inner hub 840 and a first outer ring 1021. Second turbine blade set 1002 may include a second inner hub 870 and a second outer ring 1022. Third turbine blade set 1003 may include a third inner hub 872 and a third outer ring 1023. Fourth turbine blade set 1004 may include a fourth inner hub 873 and a fourth outer ring 1025. Each of these turbine blade sets may include a plurality of turbine blades extending generally radially between the inner hub and outer ring.

As also shown in FIG. 10, ram air turbine 800 may include a case 830 configured to receive the five turbine blade sets. Only the first, third, and fifth turbine blade sets are mounted on an inner surface 835 of case 830. For example, first outer ring 1021, third outer ring 1023, and fifth outer ring 1025 may be fixedly mounted on inner surface 835 of case 830. Accordingly, the rotation of first turbine blade set 1001, third turbine blade set 1003, and fifth turbine blade set 1005 are linked to one another. In particular, first turbine blade set 1001 may rotate in a first direction 1011, third turbine blade set 1003 may rotate in a third direction 1013, and fifth turbine blade set 1005 may rotate in a fifth direction 1015, all of which may be the same rotational direction. In the illustrated embodiment, these directions may be clockwise when viewing ram air turbine 800 from the upstream end.

The second and fourth turbine blade sets may be mounted on output shaft 815. As shown in FIG. 10, second inner hub 870 of second turbine blade set 1002 may include a central hole 871 configured to be mounted on output shaft 815. In addition, fourth inner hub 873 may include a central hole 874 configured to be mounted on output shaft 815. Accordingly, the rotation of second turbine blade set 1002 and fourth turbine blade set 1004 are linked to one another. In particular, second turbine blade set 1002 may be configured to rotate in a second direction 1012 and fourth turbine blade set 1004 may be configured to rotate in a fourth direction 1014. Due to both blade sets being mounted on output shaft 815, second direction 1012 and fourth direction 1014 may be the same rotational direction. In the illustrated embodiment, second direction 1012, fourth direction 1014, and output shaft rotational direction 865 may be counter-clockwise when viewing ram air turbine 800 from the upstream end. Thus, the counter-clockwise rotating turbine blade sets counter-rotate with respect to the clockwise rotating turbine blade sets.

To transfer the rotational output of first turbine blade set 1001, third turbine blade set 1003, and fifth turbine blade set 1005 to output shaft 815, a planetary gear set 855 may be used. For example, as shown in FIG. 10, an inner surface 841 of first inner hub 840 may be configured to be mounted on a drum 845 that forms the ring gear of planetary gear set 855. Accordingly, the rotation of first turbine blade set 1001 (which is tied to that of third turbine blade set 1003 and fifth turbine blade set 1005, as described above) in the first direction 1011 rotates drum 845 in the drum rotational direction 850, which is converted by planetary gear set 855 to rotation of output shaft 815 in the output shaft rotational direction 865.

It will be understood that, in some embodiments, the rotational directions of these components may be reversed. That is, if the turbine blades of all the turbine blade sets were angled in the opposite direction, all the components would rotate in reverse of that described above. Depending on the arrangement and configuration of the generator or hydraulic pump being driven by the ram air turbine, reversed rotation of the output shaft may be desired in some cases.

The blades of one or more of the turbine blade sets may have an airfoil shape as described above with respect to FIGS. 1-5. That is, the turbine blades may have a hooked cross-sectional shape. In addition, due to the efficiencies and performance of this airfoil shape, the blades need not have a twist to them. That is, the leading edge and the trailing edge of the blade may be parallel to one another. Also, one or more of the turbine blade sets may be convergent. That is, the leading edge may form an acute angle with respect to the inner hub and an obtuse angle with respect to the outer ring.

Figure 11:
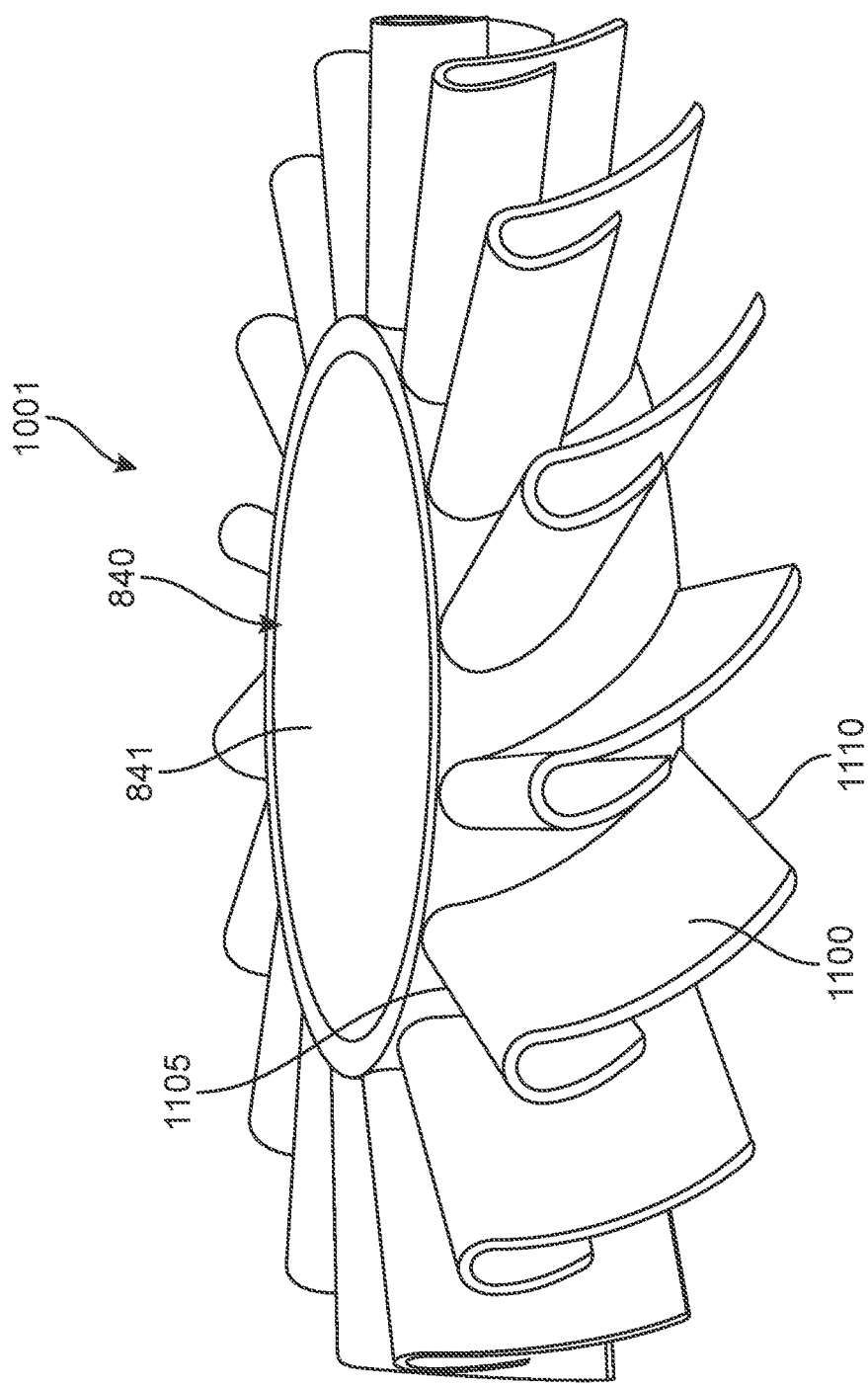
FIG. 11 is a schematic illustration of an inner hub and turbine blades of a first turbine blade set of a ram air turbine.

FIG. 11 is a schematic illustration of an inner hub and turbine blades of a first turbine blade set of a ram air turbine. In particular, FIG. 11 illustrates inner hub 840 and the turbine blades of first turbine blade set 1001. For purposes of illustration the outer ring of first turbine blade set 1001 is omitted from FIG. 11.

As shown in FIG. 11, the turbine blades 1100 of first turbine blade set may have a leading edge 1105 and a trailing edge 1110. These turbine blades 1100 may be provided without a twist. That is, leading edge 1105 and trailing edge 1110 may be parallel to one another.

Figure 12:
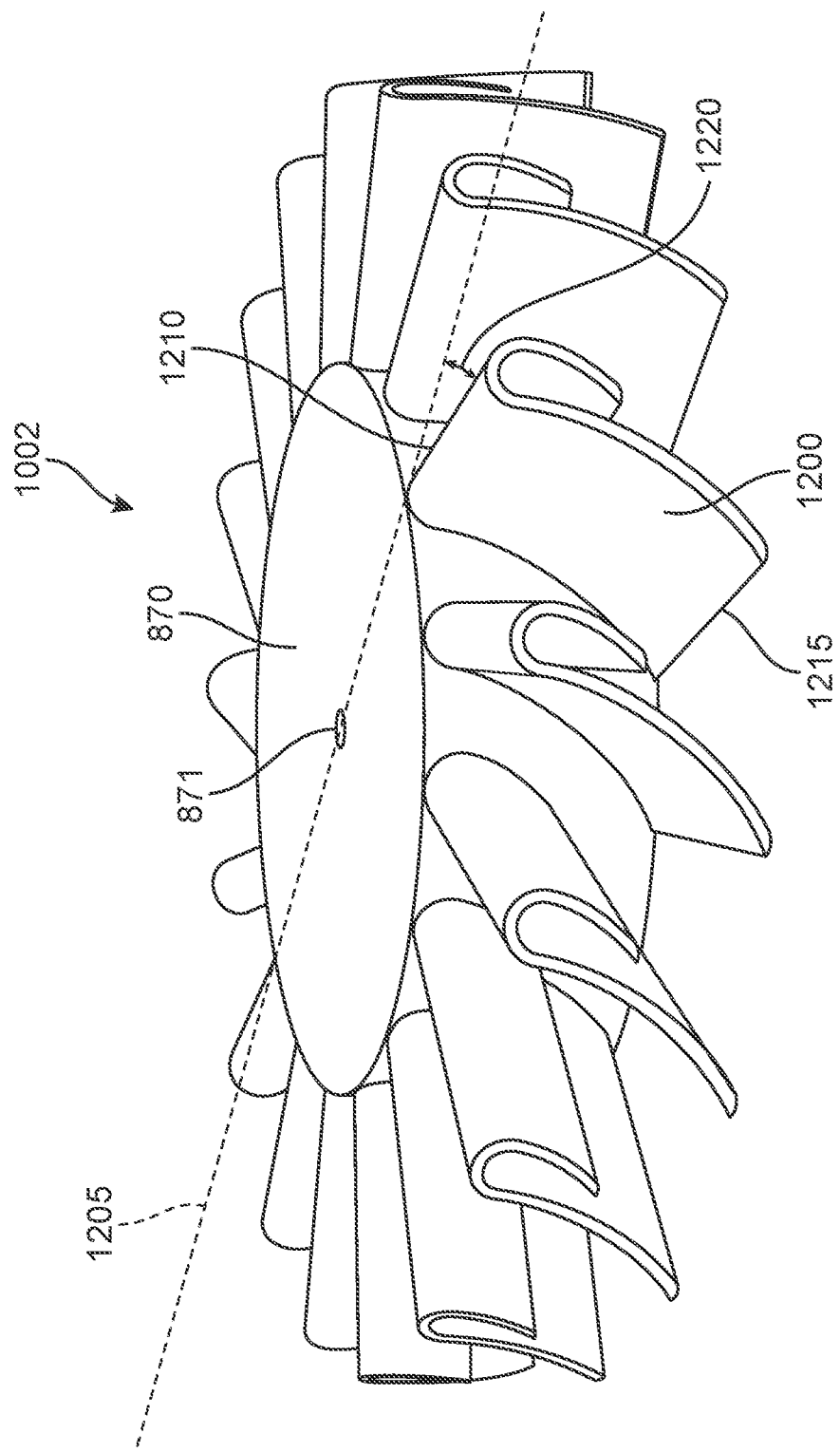
FIG. 12 is a schematic illustration of an inner hub and turbine blades of a second turbine blade set configured to rotate in an opposite direction of the first turbine blade set shown in FIG. 11.

FIG. 12 is a schematic illustration of an inner hub and turbine blades of a second turbine blade set configured to rotate in an opposite direction of the first turbine blade set shown in FIG. 11. As shown in FIG. 12, second turbine blade set 1002 may include a plurality of turbine blades 1200 extending from inner hub 870. For purposes of illustration, the outer ring of second turbine blade set 1002 is omitted from FIG. 12.

As shown in FIG. 12, turbine blades 1200 of second turbine blade set 1002 may have a leading edge 1210 and a trailing edge 1215. As also shown in FIG. 12, turbine blades 1200 may have a negative lean angle. That is, turbine blades 1200 are angled toward the high pressure side of the blade. As shown in FIG. 12, turbine blades 1200 are angled with respect to a radial axis 1205. Accordingly, turbine blades 1200 form an acute angle with inner hub 870. The lean angle is discussed in greater detail below with respect to FIGS. 20-23.

Figure 13:
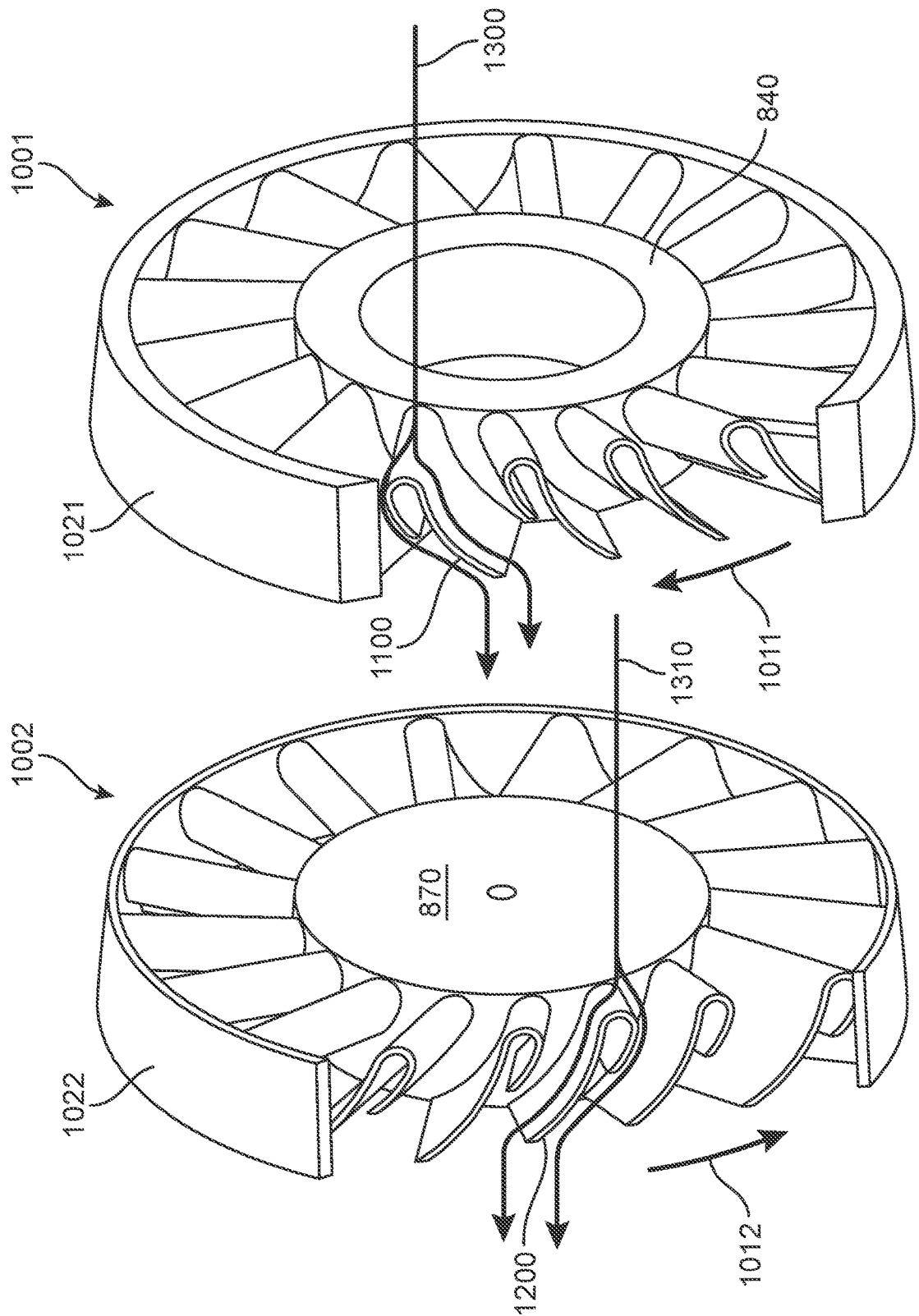
FIG. 13 is a schematic cutaway, partial cross-sectional view of the first turbine blade set shown in FIG. 11 and the second turbine blade set shown in FIG. 12.

FIG. 13 is a schematic cutaway, partial cross-sectional view of first turbine blade set 1001 shown in FIG. 11 and second turbine blade set 1002 shown in FIG. 12. As shown in FIG. 13, the airflow path through first turbine blade set 1001 is illustrated by a first arrow 1300. As a result of the shape and configuration of turbine blades 1100, this airflow rotates first turbine blade set 1001 in a first rotational direction 1011. In addition, the airflow path through second turbine blade set 1002 is illustrated by a second arrow 1310. Because of the shape and configuration of turbine blades 1200, this airflow rotates second turbine blade set 1002 in second rotational direction 1012.

Figure 14:
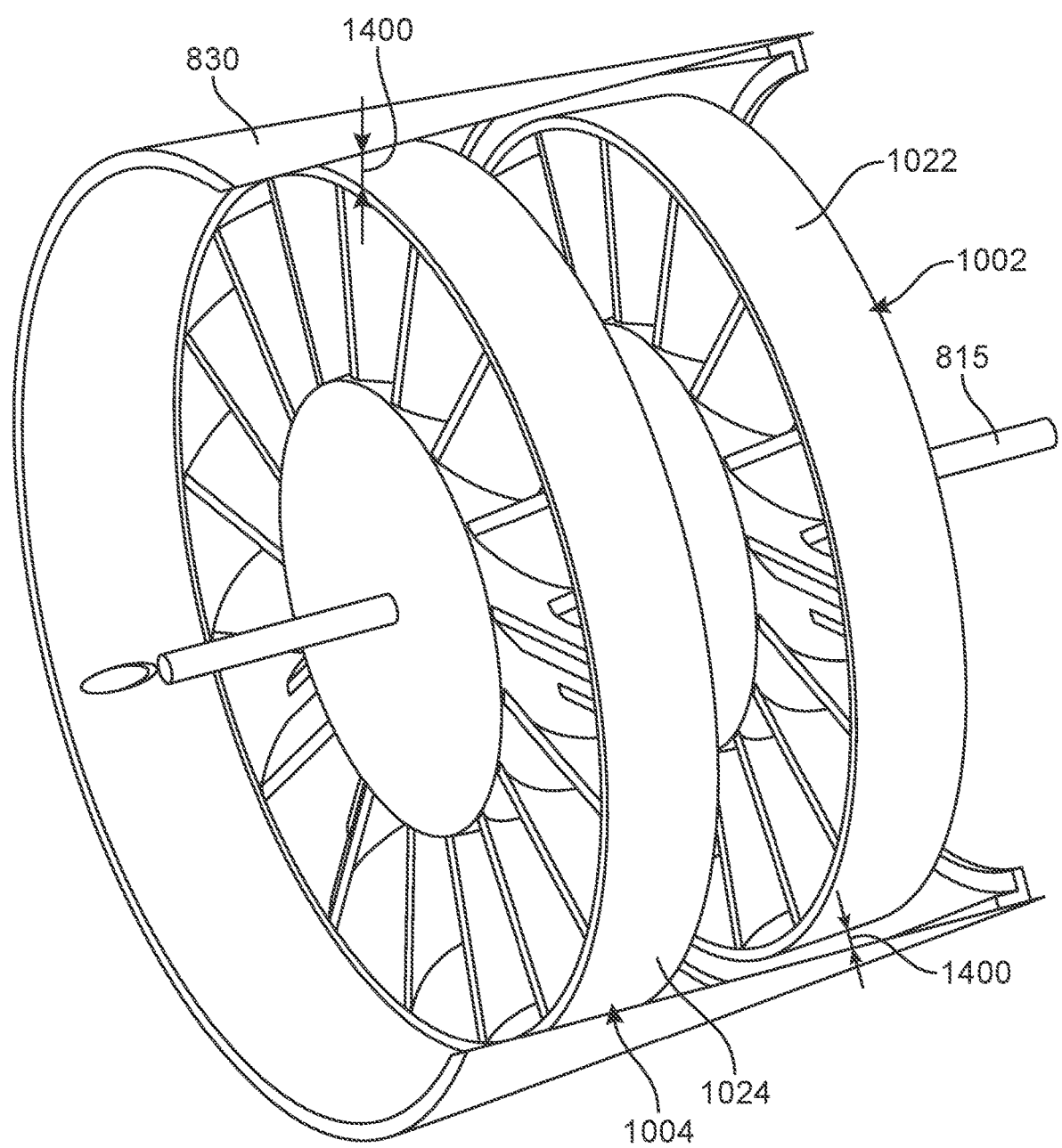
FIG. 14 is a schematic illustration of two turbine blade sets that rotate on a common shaft disposed within a case of a ram air turbine, the case being partially cut away.

FIG. 14 is a schematic illustration of two turbine blade sets that rotate on a common shaft disposed within a case of a ram air turbine, the case being partially cut away. FIG. 14 illustrates second turbine blade set 1002 and fourth turbine blade set 1004, both of which are mounted on output shaft 815. FIG. 14 shows case 830 partially cutaway in order to show the arrangement of these blade sets within case 830. Notably, there is clearance between outer ring 1022 of second turbine blade set 1002 and case 830, as shown by a first gap 1400. Similarly, there is clearance between outer ring 1024 of fourth turbine blade set 1004 and case 830, as shown by a second gap 1400. These gaps may enable second turbine blade set 1002 and fourth turbine blade set 1004 to rotate freely within case 830.

Figure 15:
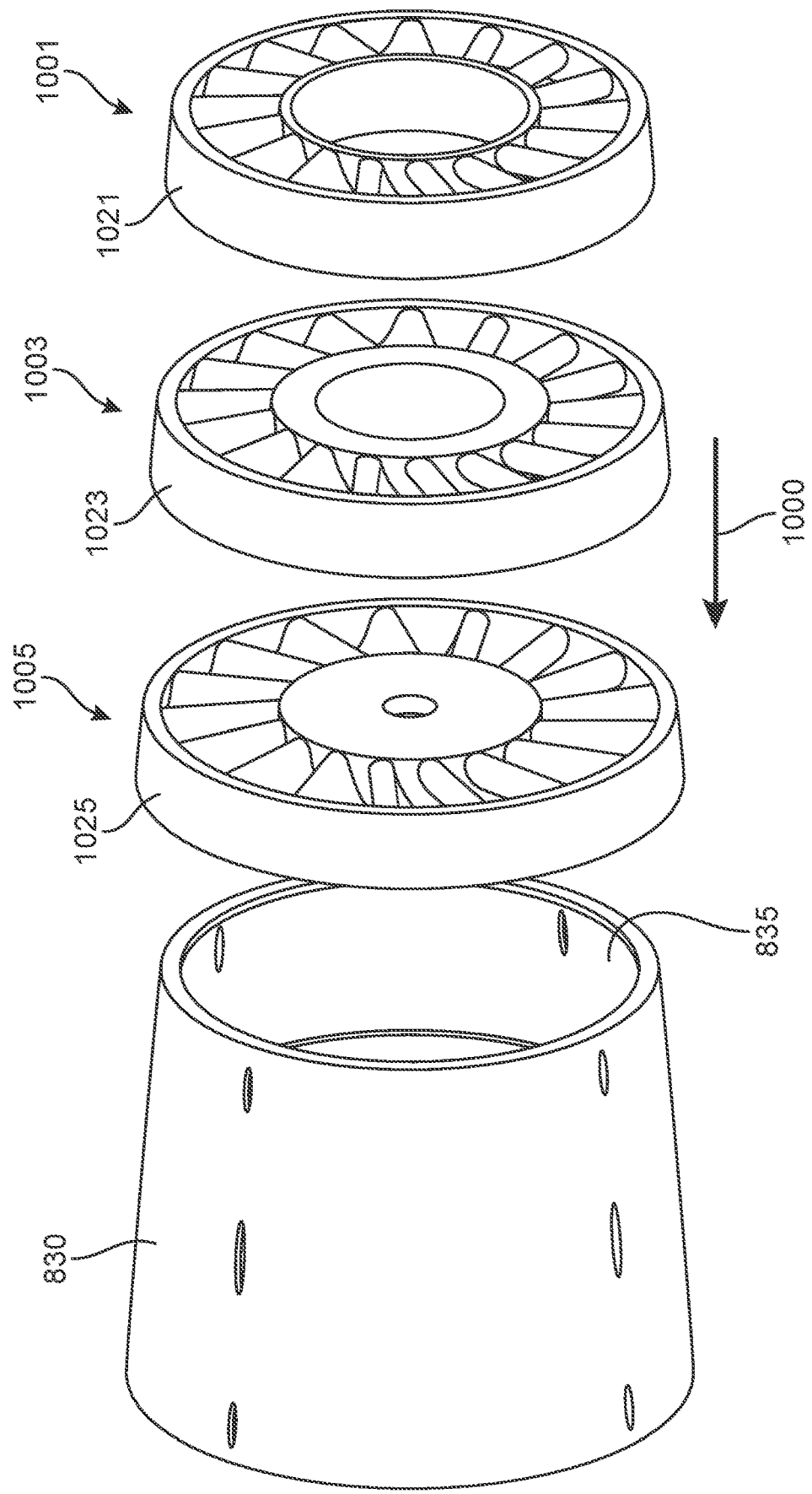
FIG. 15 is a schematic exploded view of a case and three turbine blade sets that rotate with the case.

FIG. 15 is a schematic exploded view of case 830 and the other three turbine blade sets. These three turbine blade sets rotate with case 830. Outer ring 1021, outer ring 1023, and outer ring 1025 are mounted to inner surface 835 of case 830. This mounting may be by any suitable mounting configuration. For example, in some embodiments, these components may be friction fit, press fit, etc.

As also shown in FIG. 15, casing 830 may have the form of a nozzle with a diverging configuration in the direction of air flow 1000 through the ram air turbine. This diverging nozzle configuration of casing 830 may reduce air speed through the ram air turbine, which increases pressure. This may provide for smoother flow through the ram air turbine. In addition, since the turbine blade sets may be convergent (i.e., negative lean angle), the diverging nozzle may at least partially offset the convergent flow of air through the counter-rotating blade sets.

Figure 16:
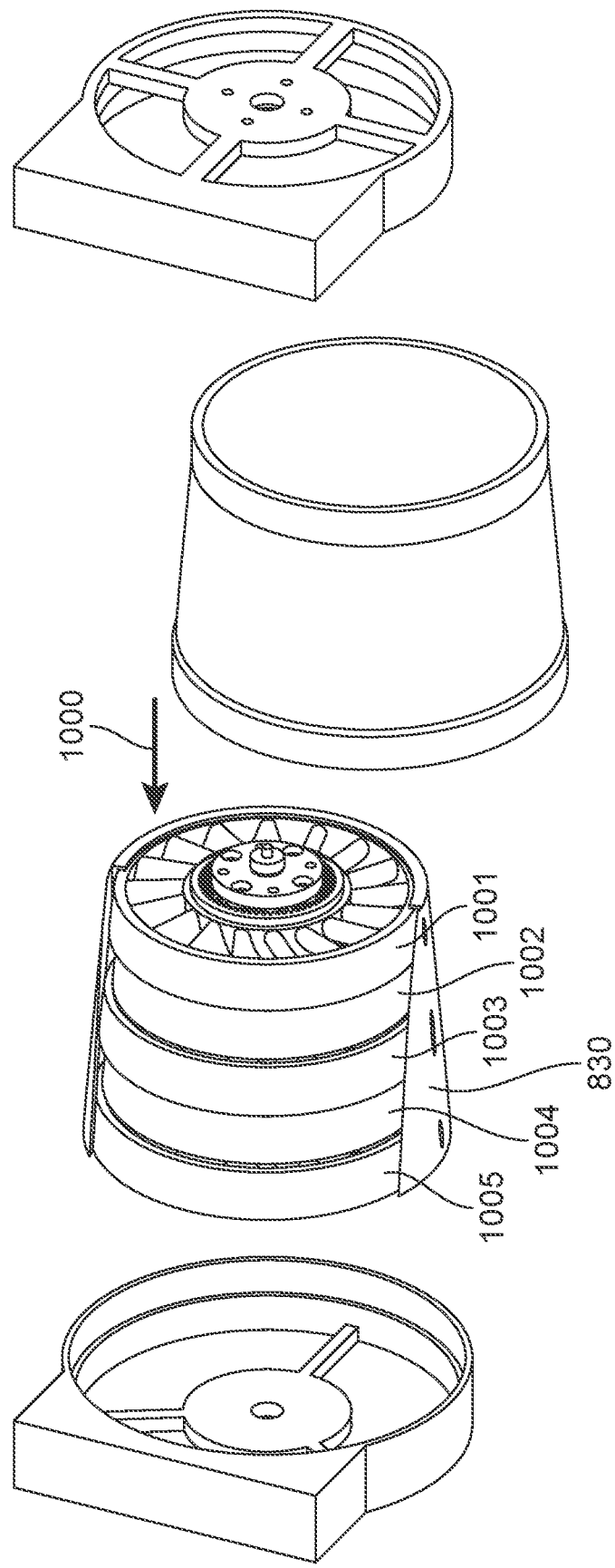
FIG. 16 is a schematic partially exploded view of a ram air turbine.
Figure 17:
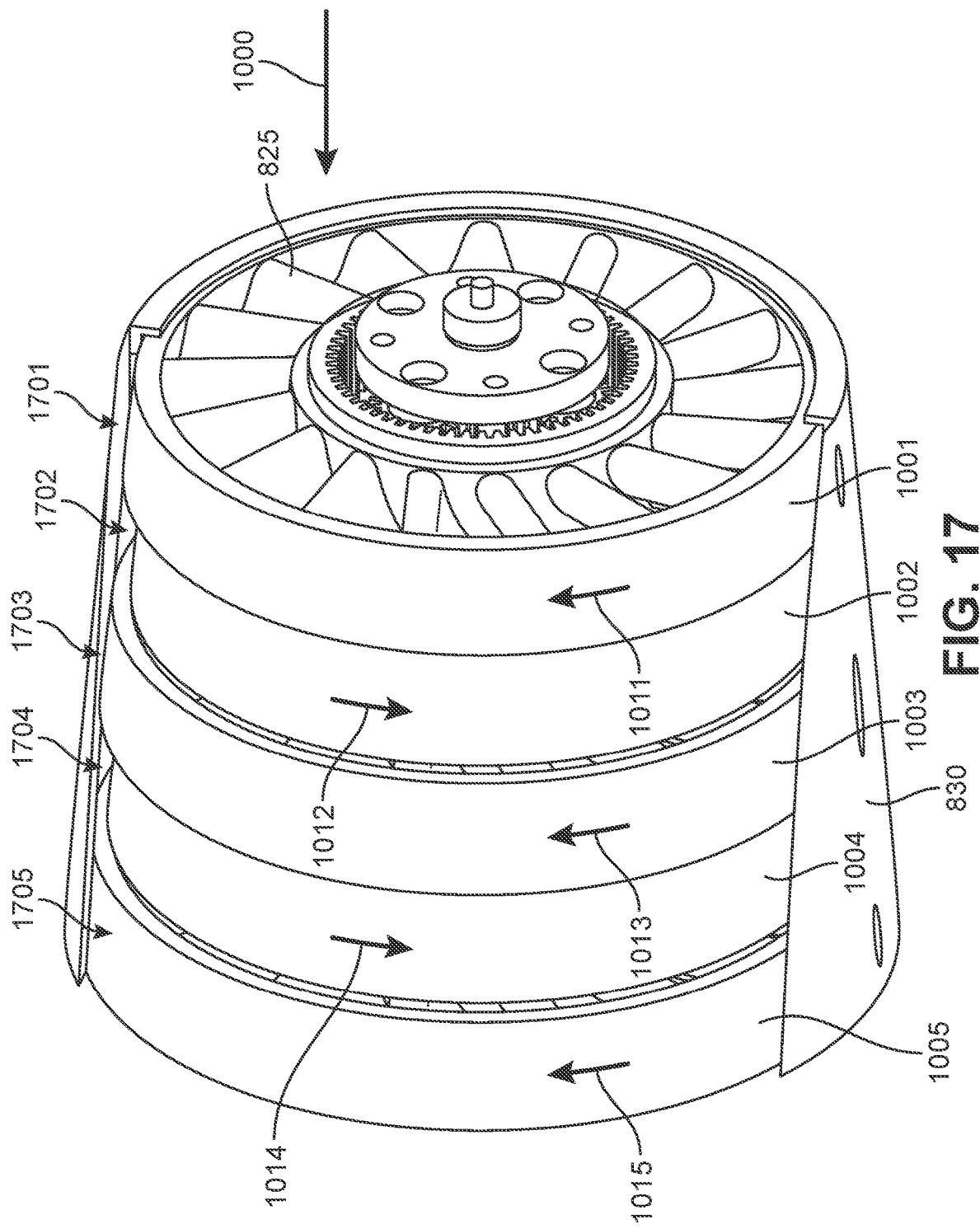
FIG. 17 is a schematic view of five counter-rotating turbine blade sets inside of a partially cutaway case.

FIG. 16 is a schematic partially exploded view of a ram air turbine. In FIG. 16, all five turbine blade sets are housed within case 830, which has been partially cut away in order to better illustrate the arrangement within case 830. FIG. 17 is a schematic view of the five counter-rotating turbine blade sets inside of the partially cutaway case, and enlarged compared to FIG. 16. As shown in FIG. 17, the directions of rotation of the clockwise rotating turbine blade sets are indicated by first direction 1011, third direction 1013, and fifth direction 1015. The directions of rotation of the counter-rotating turbine blade sets are indicated by second direction 1012 and fourth direction 1014.

In addition, FIG. 17 also shows the clearances (and lack thereof) between the turbine blade sets and case 830. In particular, in a first area 1701, there is no gap between first turbine blade set 1001 and case 830, as these components are fixed to one another. In contrast, in a second area 1702, a gap is visible between second turbine blade set 1002 and case 830. Similarly, no gap is shown in a third area 1703 between third turbine blade set 1003 and case 830, a gap is shown in a fourth area 1704 between fourth turbine blade set 1004 and case 830, and no gap is shown in a fifth area 1705 between fifth turbine blade set 1005 and case 830.

Figure 18:
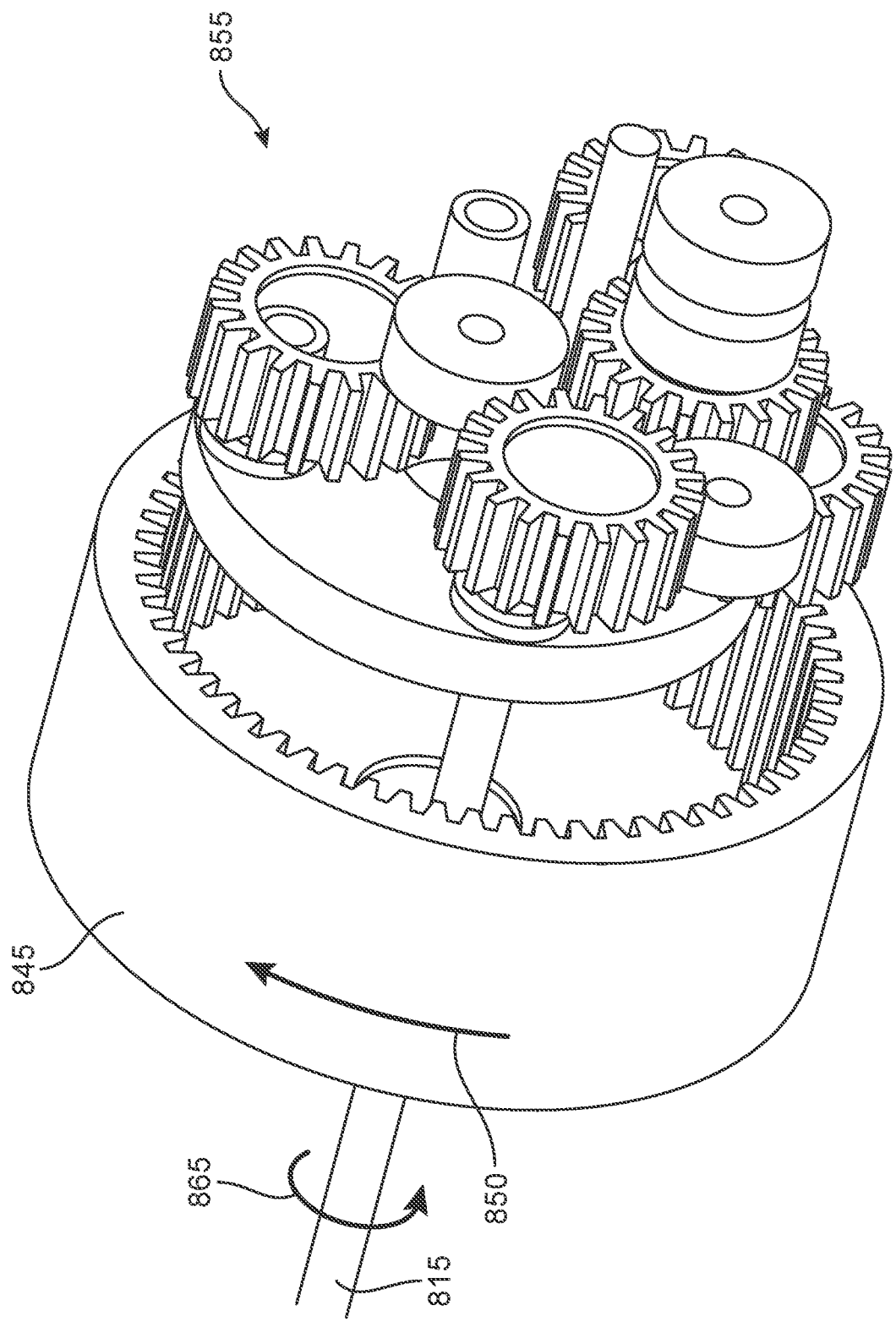
FIG. 18 is a schematic illustration of a planetary gear set of a ram air turbine.

FIG. 18 is a schematic illustration of a planetary gear set 855. As shown in FIG. 18, the rotation of drum 845 in rotational direction 850 is converted by the planetary gears to rotation of output shaft 815 in rotational direction 865, which is the opposite of rotational direction 850. The arrangement of planetary gear set 855 may be any suitable configuration for reversing the rotational output of the first, third, and fifth turbine blade sets. Those skilled in the art will recognize such configurations.

Figure 19:
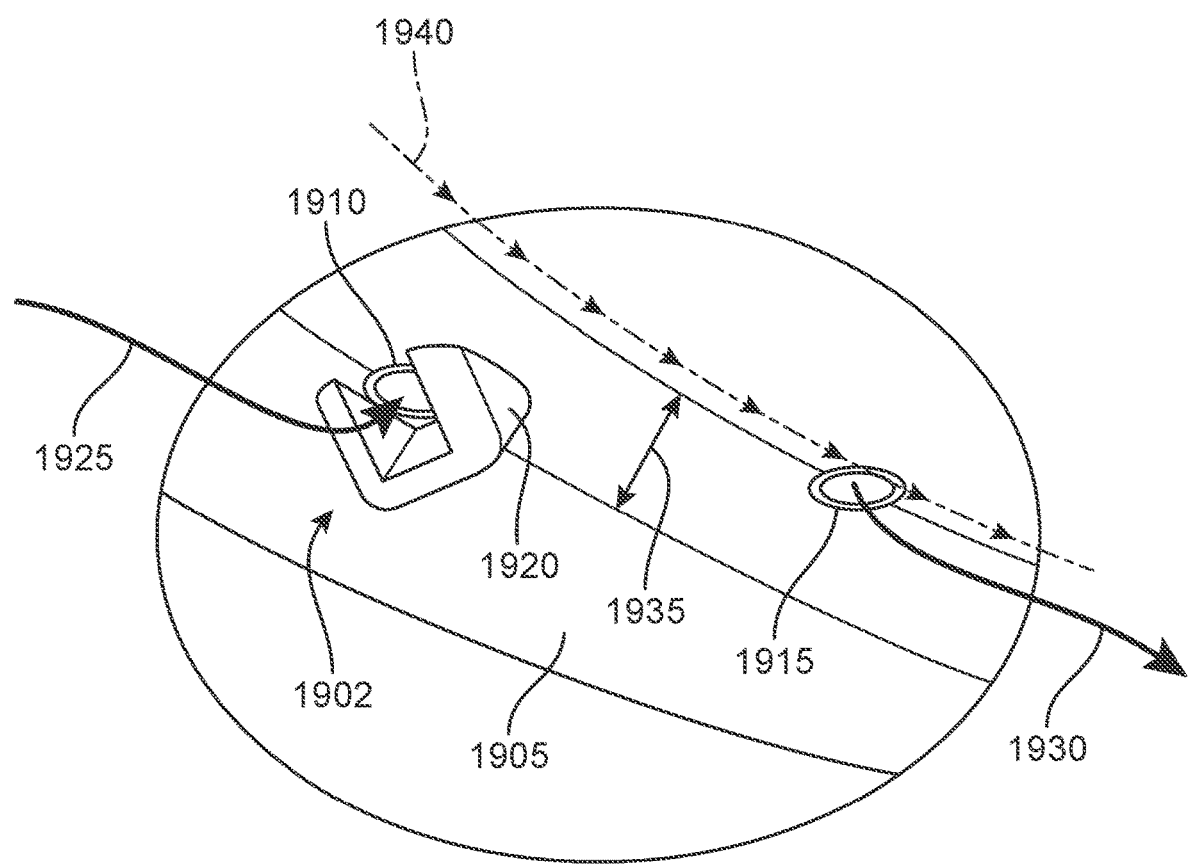
FIG. 19 is a schematic illustration of an aircraft with an enlarged view of externally exposed components of a ram air turbine system having an inlet and outlet that are laterally offset from one another.

FIG. 19 is a schematic illustration of an aircraft with an enlarged view of externally exposed components of a ram air turbine system according to an alternative embodiment. As shown in FIG. 19, an aircraft may include a ram air turbine system 1902. The aircraft may include a body shell 1905. Like system 602, system 1902 may be located at any suitable location of the aircraft.

As shown in FIG. 19, system 1902 may include an air inlet 1910, into which air from the air stream outside of body shell 1905 may flow, as indicated by an arrow 1925. Air entering air inlet 1910 may be directed to a ram air turbine located inside body shell 1905 (see FIG. 7). Additional airflow may be directed into air inlet 1910 by an air scoop 1920. In some embodiments air scoop 1620 may be deployable. Accordingly, in an undeployed position (not shown), air scoop 1920 may sit flush, or substantially flush, with the outer surface of body shell 1905. In a deployed position, as shown in FIG. 19, air scoop 1920 may collect and guide or direct air into air inlet 1910. Air scoop 1920 may include suitable features to provide air flow at a speed and consistency desired for operation of the ram air turbine. Air scoop 1920 may be formed of any suitable material, such as carbon fiber, aluminum, titanium, steel, stainless steel, or any other material with the strength and rigidity to be deployed into the airstream around the aircraft on which it is implemented.

The deployment mechanism of air scoop 1920 is not shown. It will be understood that any suitable deployment mechanism may be used for the deployment of air scoop 1920, and that skilled artisans will appreciate mechanisms that are suitable for deploying an air scoop into an air stream at a given aircraft speed.

In addition, as also shown in FIG. 19, body shell 1905 may include an air outlet 1915. Air exiting the ram air turbine within body shell 1905 may be directed out of air outlet 1915. Accordingly, to facilitate the air flow through the ram air turbine, air inlet 1910 and air outlet 1915 may be arranged spaced from one another in the direction of aircraft flight. While the two ports need not necessarily be located directly in line with one another, the air flow through the ram air turbine is facilitated if air inlet 1910 is positioned further forward toward the front of the aircraft and air outlet 1915 is positioned further aft toward the rear of the aircraft.

In addition to the air stream flowing into inlet 1910 and through the RAT inside the aircraft body shell 1905, airflow through the system is also driven by the venturi effect at outlet 1915. While the venturi effect does drive the air flow through system 1902, this effect may be tempered by the presence of air scoop 1920 being aligned with outlet 1915 in the direction of the air stream. In order to maximize the venturi effect, in some embodiments, the outlet may be located not only spaced in the direction of air flow, but also laterally. For example, as shown in FIG. 19, outlet 1915 may be spaced laterally from inlet 1910, as indicated by an arrow 1935. Accordingly, a clean airstream flows over outlet 1915, undisrupted by air scoop 1920, as indicated by an arrow 1940.

In some embodiments, the lean angle of the blades may be selected to ensure that the edges of the blades in adjacent blade sets are aligned. Because of the pitch angle of the blades, the leading edges and the trailing edges are aligned differently with respect to radial axes.

Figure 20:
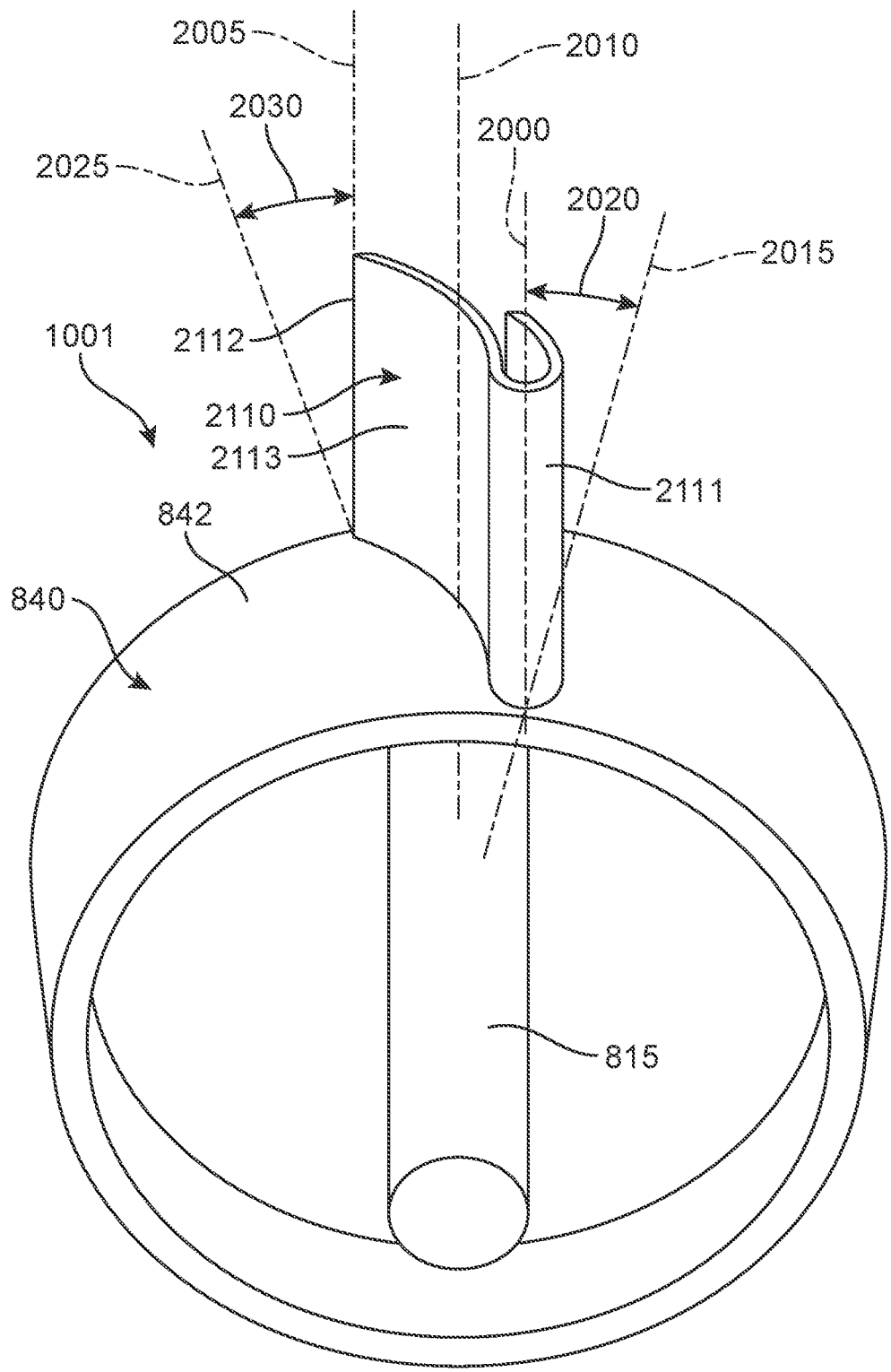
FIG. 20 is a schematic illustration of a portion of a turbine wheel, illustrating a lean angle of a turbine blade.

FIG. 20 is a schematic illustration of a portion of a turbine wheel, illustrating a lean angle of a turbine blade. In particular, FIG. 20 shows a portion of first turbine blade set 1001. For purposes of illustration, the outer ring of first turbine blade set 1001 is omitted from FIG. 20, and only a single blade 2110 is shown extending from an outer surface 842 of first inner hub 840 of first blade 2110.

As shown in FIG. 20, first turbine blade 2110 includes a first leading edge 2111, a first trailing edge 2112, and a first center portion 2113 between first leading edge 2111 and first trailing edge 2112. As also shown in FIG. 20, first leading edge 2111 extends along a leading edge axis 2000. Similarly, first trailing edge 2112 extends along a trailing edge axis 2005. Further, a center portion axis 2010 illustrates the alignment of first center portion 2110.

For perspective, output shaft 815 is shown to illustrate the radial center point of first turbine blade set 1001. Accordingly, FIG. 20 shows that center portion axis 2010 extends radially. However, because of the pitch angle of first blade 2110, neither first leading edge 2111 nor first trailing edge 2112 extend radially. A first radial axis 2015 is illustrated at first leading edge 2111. As shown in FIG. 20, the difference between first radial axis 2015 and leading edge axis 2000 is shown by a leading edge angle 2020. Because the radially inward end of first leading edge 2111 is located further in the direction of rotation than the radially outward end of first leading edge 2111, first blade 2110 has a negative lean angle.

Figure 22:
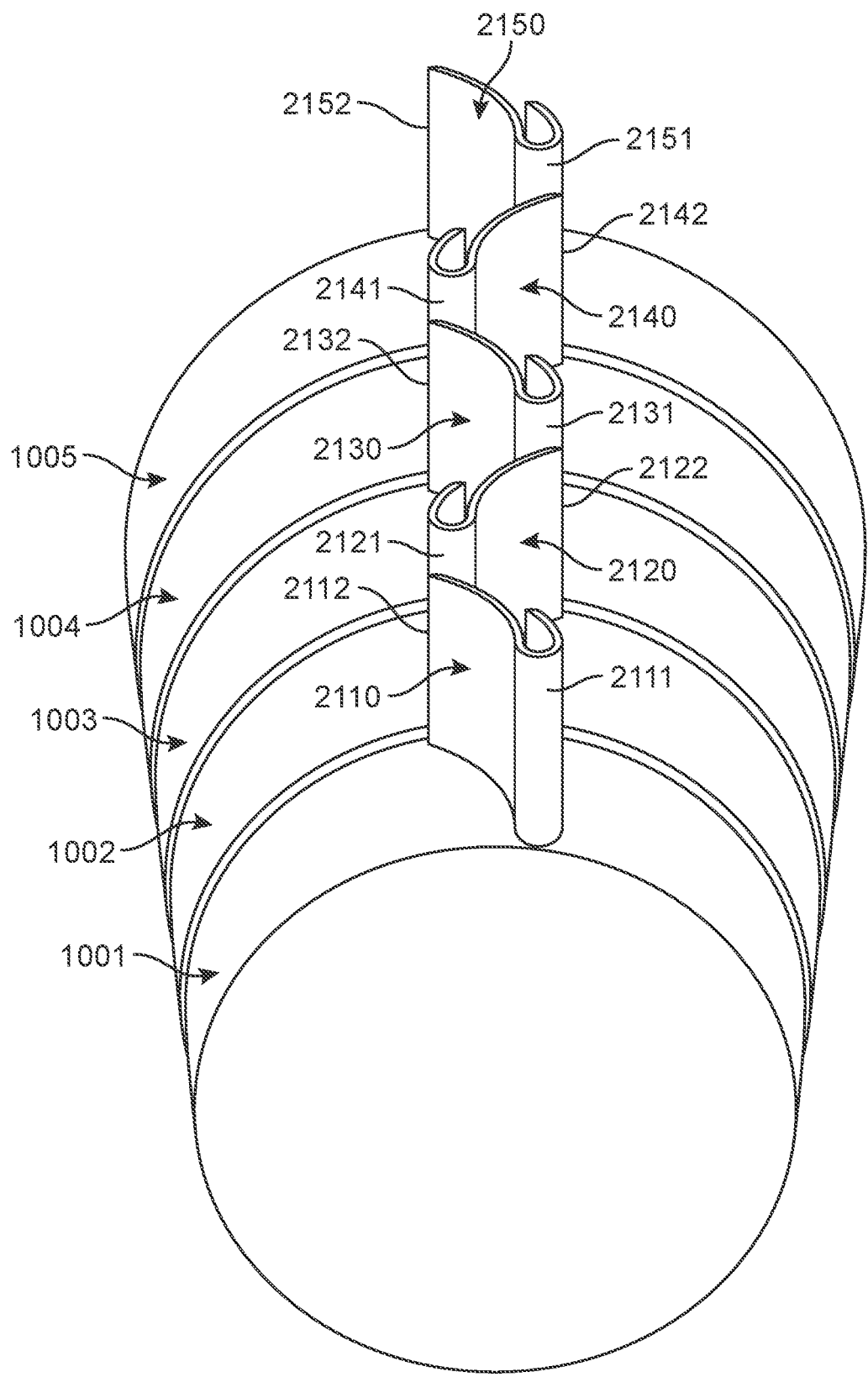
FIG. 22 is a schematic perspective view illustration of the portions of adjacent turbine blade sets shown in FIG. 21.
Figure 23:
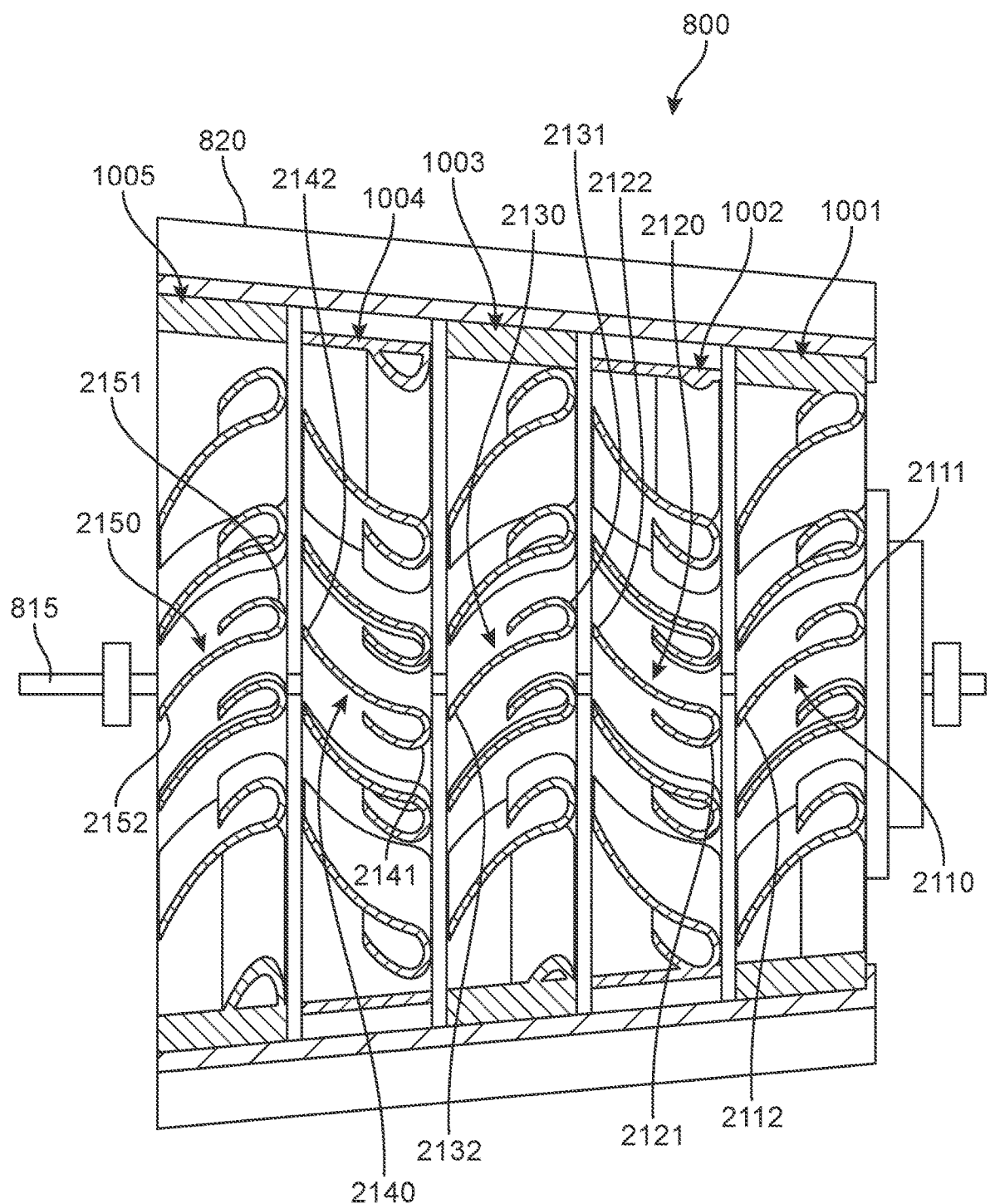
FIG. 23 is a schematic cutaway cross-sectional view of a ram air turbine.

As also shown in FIG. 20, a second radial axis 2025 extends through first trailing edge 2112. Trailing edge axis 2005 is offset from second radial axis 2025 by a trailing edge angle 2030. Because center portion axis 2010 is oriented radially, leading edge angle 2020 and trailing edge angle 2030 may be equal and opposite. This enables the trailing edges of blades in a given turbine blade set to align with leading edges of blades in an adjacent, downstream turbine blade set. This alignment of leading and trailing edges in adjacent blade sets is illustrated in FIGS. 21-23.

Figure 21:
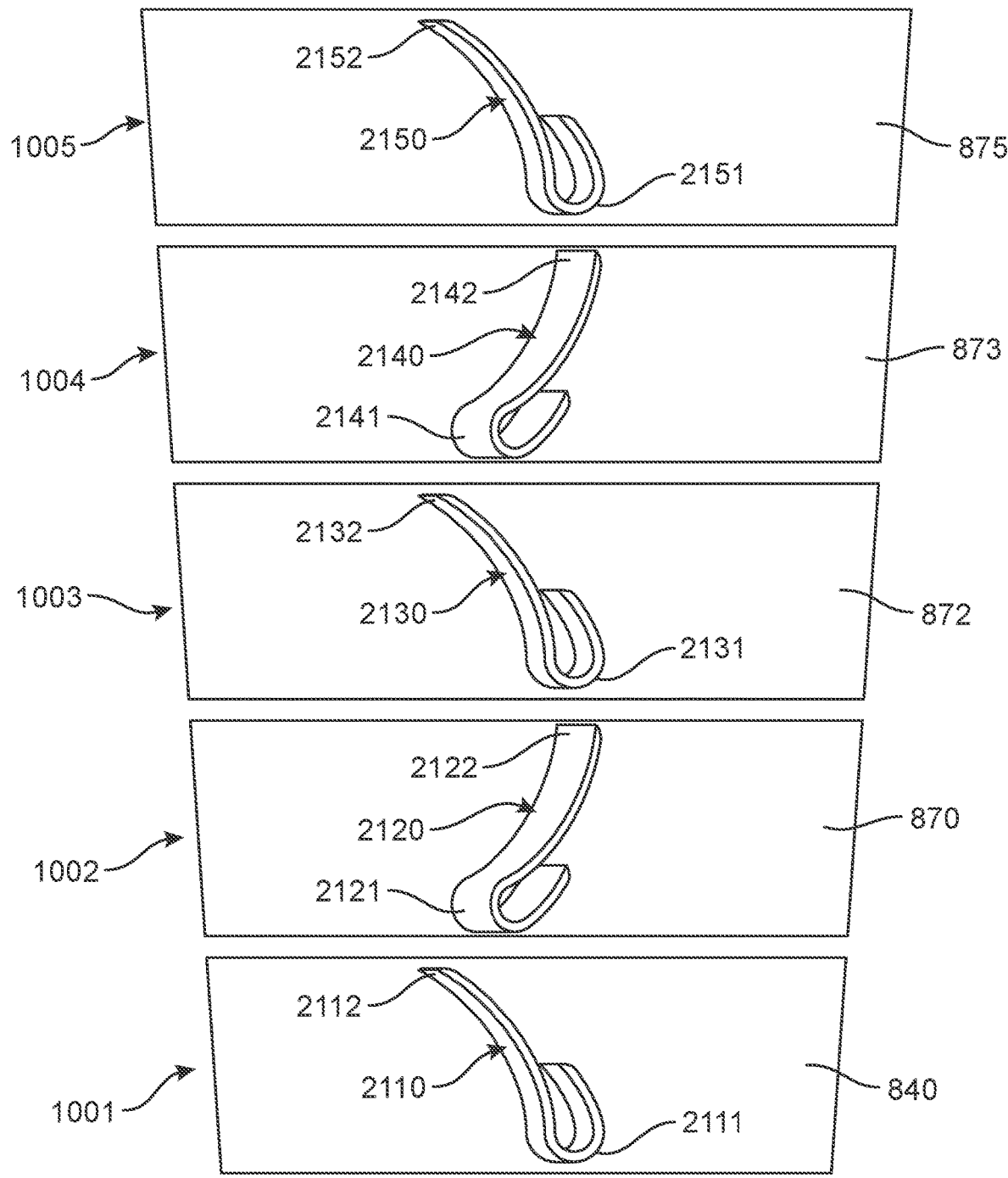
FIG. 21 is a schematic lateral view illustration of portions of adjacent turbine blade sets, illustrating the alternating orientations of the blades.

FIG. 21 is a schematic lateral view illustration of portions of adjacent turbine blade sets, illustrating the alternating orientations of the blades. As shown in FIG. 21, first turbine blade set 1001, is stacked with second turbine blade set 1002, third turbine blade set 1003, fourth turbine blade set 1004, and fifth turbine blade set 1005. Second turbine blade set 1002 includes a second blade 2120 extending from second inner hub 870 and having a second leading edge 2121 and a second trailing edge 2122. As shown in FIG. 21, second leading edge 2121 aligns with first trailing edge 2112 when first blade 2110 and second blade 2120 are aligned with one another. That is, when the central portions (between the leading and trailing edges) of each blade are aligned, the leading edges and trailing edges are aligned with one another along the substantially the entire length of the leading edge and corresponding trailing edge. Put another way, the leading edge and aligned trailing edge of adjacent blades are disposed in the same plane. This provides smooth flow of fluid between adjacent turbine blade sets.

Similarly, third turbine blade set 1003 may include a third blade 2130 extending from third inner hub 872. Third blade 2130 has a third leading edge 2131 and a third trailing edge 2132. Third leading edge 2131 aligns with second trailing edge 2122 when third blade 2130 is aligned with second blade 2120.

Further, fourth turbine blade set 1004 may include a fourth blade 2140 extending from fourth inner hub 873. Fourth blade 2140 has a fourth leading edge 2141 and a fourth trailing edge 2142. Fourth leading edge 2141 aligns with third trailing edge 2132 when fourth blade 2140 is aligned with third blade 2130.

In addition, fifth turbine blade set 1005 may include a fifth blade 2150 extending from fifth inner hub 875. Fifth blade 2150 has a fifth leading edge 2151 and a fifth trailing edge 2152. Fifth leading edge 2151 aligns with fourth trailing edge 2142 when fifth blade 2150 is aligned with fourth blade 2140.

FIG. 22 is a schematic perspective view illustration of the portions of adjacent turbine blade sets shown in FIG. 21. At the perspective shown in FIG. 22, it can be seen that first trailing edge 2112, second leading edge 2121, third trailing edge 2132, fourth leading edge 2141, and fifth trailing edge 2152 are all aligned with one another. Similarly, first leading edge 2111, second trailing edge 2122, third leading edge 2131, fourth trailing edge 2142, and fifth leading edge 2151 are all aligned with one another.

FIG. 23 is a schematic cutaway cross-sectional view of a ram air turbine. Again, first blade 2110, second blade 2120, third blade 2130, fourth blade 2140, and fifth blade 2150 are aligned. And again, first trailing edge 2112, second leading edge 2121, third trailing edge 2132, fourth leading edge 2141, and fifth trailing edge 2152 are all aligned with one another; and first leading edge 2111, second trailing edge 2122, third leading edge 2131, fourth trailing edge 2142, and fifth leading edge 2151 are all aligned with one another.

The ram air turbine embodiments discussed above may be much more efficient in converting airflow to rotational energy. Accordingly, the size and weight of such ram air turbines may be significantly less than of typical ram air turbines. Generally, ram air turbines on aircraft are propeller type turbines. Accordingly, they must have a relatively large diameter in order to produce the power output desired. For example, while typical large size ram air turbines have a diameter between 2.6 feet to 5.3 feet and produce energy in the range of approximately 5 kW to 70 kW, the ram air turbine described above sized at approximately 3 feet in diameter may be capable of producing 80 kW or more. Thus, the same power output may be generated with a ram air turbine that is two thirds the diameter of typical ram air turbines or less.

Because of the smaller size, there may be more options for placement of the disclosed ram air turbines in the aircraft. Also, the disclosed ram air turbines may be much lighter than typical ram air turbines as well.

It will be noted that the disclosed ram air turbines are passive machines that simply convert airflow through the device into rotational motion, which may be used to generate electricity. Accordingly, the disclosed ram air turbine configuration may also be implemented as a wind turbine. That is, the disclosed embodiments may be used as an earth-mounted windmill. The size and mounting structures may be varied accordingly to accommodate the alternative use. The internal configuration of the ram air turbine may also have certain variations to maximize efficiencies for the slower air speeds of wind as compared to the airstream around an aircraft.

While various embodiments of the invention have been described, the description is intended to be exemplary, rather than limiting, and it will be apparent to those of ordinary skill in the art that many more embodiments and implementations are possible that are within the scope of the invention. Any element of any embodiment may be substituted for another element of any other embodiment or added to another embodiment except where specifically excluded. Accordingly, the invention is not to be restricted except in light of the attached claims and their equivalents. Also, various modifications and changes may be made within the scope of the attached claims.

The invention claimed is:

1. A ram air turbine system, comprising:
   a ram air turbine configured such that, when the ram air turbine is affixed to structure of an aircraft, the ram air turbine is driven by airflow during flight;
   a hydraulic pump or electric power generator operatively connected to, and disposed along side of, the ram air turbine;
   wherein the ram air turbine includes an outer housing having disposed therein:
   an output shaft;
   a first turbine blade set configured to rotate in a first direction;
   a second turbine blade set configured to counter-rotate with respect to the first turbine blade set;
   a third turbine blade set configured to rotate in the first direction;
   the first turbine blade set including a first outer ring and a first plurality of turbine blades extending substantially radially inward from the first outer ring;
   the third turbine blade set including a second outer ring and a second plurality of turbine blades extending substantially radially inward from the second outer ring;
   a substantially cylindrical case configured to receive the first turbine blade set, the second turbine blade set, and the third turbine blade set;
   wherein the first outer ring of the first turbine blade set and the second outer ring of the third turbine blade set are mounted on an inner surface of the case such that the rotation of the first turbine blade set and rotation of the third turbine blade set are linked together;
   wherein the rotation of the first turbine blade set and third turbine blade set and the counter-rotation of the second turbine blade set drives the output shaft of the ram air turbine; and
   wherein the ram air turbine is configured to be housed inside a body shell of an aircraft and the ram air turbine system further includes:
   an intake conduit configured to guide air from an air inlet in the body shell of the aircraft to an upstream end of the outer housing of the ram air turbine; and
   an outlet conduit configured to guide air exiting a downstream end of the outer housing of the ram air turbine to an air outlet in the body shell.

2. The ram air turbine system of claim 1, wherein the blades of the first turbine blade set have the shape of an airfoil, including:
   a leading edge and a trailing edge;
   a suction side and a pressure side;
   a base portion including a first surface associated with the pressure side and a second surface associated with the suction side;
   an overhang portion that extends over some of the base portion;
   an elliptic portion connecting the base portion and the overhang portion adjacent the leading edge; and
   wherein the overhang portion is curved toward the second surface of the base portion.

3. The ram air turbine system of claim 2, wherein the overhang portion comprises a first arc portion having a first radius of curvature on the suction side and the overhang portion comprising a second arc portion having a second radius of curvature on the suction side that is different from the first radius of curvature.

4. The ram air turbine system of claim 3, wherein the second radius of curvature is greater than the first radius of curvature.

5. The ram air turbine system of claim 2, wherein a free end of the overhang portion is separated from the base portion by a gap, and wherein the gap is substantially greater than a local thickness of the overhang portion.

6. The ram air turbine system of claim 1, wherein the first turbine blade set includes a first blade having a first leading edge and a first trailing edge, and the second turbine blade set includes a second blade having a second leading edge and a second trailing edge; and
   wherein, when the first blade is aligned with the second blade, the second leading edge of the second blade is aligned with the first trailing edge of the first blade.

7. The ram air turbine system of claim 1,
   wherein the plurality of turbine blades of the first turbine blade set have the shape of an airfoil, including a leading edge and a trailing edge;
   wherein the leading edge has a negative lean angle forming an obtuse angle with respect to the outer ring.

8. The ram air turbine system of claim 7, wherein the second turbine blade set includes:
   an inner hub; and
   a plurality of turbine blades extending substantially radially outward from the inner hub;
   wherein the plurality of turbine blades of the second turbine blade set have the shape of an airfoil, including a leading edge and a trailing edge;
   wherein the leading edge has a negative lean angle forming an acute angle with respect to the inner hub.

9. The ram air turbine system of claim 1, wherein the outer housing of the ram air turbine has the form of a nozzle with a diverging configuration in the direction of air flow through the ram air turbine.

10. An aircraft, comprising:
    a body shell having an air inlet and an air outlet arranged spaced from one another in the direction of aircraft flight;
    a ram air turbine system including:
    a ram air turbine fixedly housed inside the body shell of the aircraft;
    an intake conduit configured to guide air from the air inlet in the body shell to an upstream end of an outer housing of the ram air turbine; and
    an outlet conduit configured to guide air exiting the ram air turbine from a downstream end of the outer housing of the ram air turbine to the air outlet in the body shell;
    wherein the ram air turbine includes, disposed within the outer housing:
    an output shaft;

a first turbine blade set configured to rotate in a first direction; and a second turbine blade set configured to counter-rotate with respect to the first turbine blade set;

a third turbine blade set configured to rotate in the first direction;

the first turbine blade set including a first outer ring and a first plurality of turbine blades extending substantially radially inward from the first outer ring;

the third turbine blade set including a second outer ring and a second plurality of turbine blades extending substantially radially inward from the second outer ring;

a substantially cylindrical case configured to receive the first turbine blade set, the second turbine blade set, and the third turbine blade set;

wherein the first outer ring of the first turbine blade set and the second outer ring of the third turbine blade set are mounted on an inner surface of the case such that the rotation of the first turbine blade set and rotation of the third turbine blade set are linked together;

wherein the rotation of the first turbine blade set and the third turbine blade set and the counter-rotation of the second turbine blade set drives the output shaft; and the ram air turbine system further including a hydraulic pump or an electrical power generator fixedly housed inside the body shell of the aircraft, disposed along side the ram air turbine, and configured to be driven by the ram air turbine.

11. The aircraft of claim 10, wherein the blades of the first turbine blade set have the shape of an airfoil, including:

a leading edge and a trailing edge;

a suction side and a pressure side;

a base portion including a first surface associated with the pressure side and a second surface associated with the suction side;

an overhang portion that extends over some of the base portion;

an elliptic portion connecting the base portion and the overhang portion adjacent the leading edge; and wherein the overhang portion is curved toward the second surface of the base portion.

12. The aircraft of claim 11, wherein the overhang portion comprises a first arc portion having a first radius of curvature on the suction side and the overhang portion comprising a second arc portion having a second radius of curvature on the suction side that is different from the first radius of curvature.

13. The aircraft of claim 12, wherein the second radius of curvature is greater than the first radius of curvature.

14. The aircraft of claim 11, wherein a free end of the overhang portion is separated from the base portion by a gap, and wherein the gap is substantially greater than a local thickness of the overhang portion.

15. The aircraft of claim 14, wherein the gap is at least twice as large as the local thickness of the overhang portion.

16. The aircraft of claim 11, wherein the leading edge and the trailing edge are parallel to one another.

17. The aircraft of claim 10, wherein the ram air turbine system includes a deployable air scoop configured to, in a deployed position, guide air from an airstream around the aircraft into the inlet in the body shell.

18. The aircraft of claim 10, wherein the ram air turbine is integrated into a flap track fairing of the aircraft.

19. The aircraft of claim 10, wherein the ram air turbine system includes the hydraulic pump fixedly housed inside the body shell of the aircraft, and configured to be driven by the ram air turbine.

20. The aircraft of claim 10, wherein the ram air turbine system includes the electric power generator fixedly housed inside the body shell of the aircraft, and configured to be driven by the ram air turbine.

* * * * *